United States Patent
Ki

(10) Patent No.: US 11,288,212 B2
(45) Date of Patent: Mar. 29, 2022

(54) SYSTEM, APPARATUS, AND METHOD FOR SECURE DEDUPLICATION

(71) Applicant: Samsung Electronics Co., Ltd., Suwon-si (KR)

(72) Inventor: Yang Seok Ki, Palo Alto, CA (US)

(73) Assignee: SAMSUNG ELECTRONICS CO., LTD.

(*) Notice: Subject to any disclaimer, the term of this patent is extended or adjusted under 35 U.S.C. 154(b) by 0 days.

(21) Appl. No.: 16/846,265

(22) Filed: Apr. 10, 2020

(65) Prior Publication Data

US 2021/0191880 A1 Jun. 24, 2021

Related U.S. Application Data

(60) Provisional application No. 62/950,105, filed on Dec. 18, 2019.

(51) Int. Cl.
| G06F 12/00 | (2006.01) |
| G06F 13/00 | (2006.01) |
| G06F 13/28 | (2006.01) |
| G06F 12/14 | (2006.01) |
| G06F 21/79 | (2013.01) |

(52) U.S. Cl.
CPC .......... *G06F 12/1408* (2013.01); *G06F 21/79* (2013.01); *G06F 2212/1052* (2013.01); *G06F 2212/2022* (2013.01)

(58) Field of Classification Search
CPC ................. G06F 12/1408; G06F 21/79; G06F 2212/1052

USPC .......................................................... 711/103
See application file for complete search history.

(56) References Cited

U.S. PATENT DOCUMENTS

| | | | |
|---|---|---|---|
| 8,117,464 B1 | 2/2012 | Kogelnik | |
| 9,043,287 B2 | 5/2015 | Periyagaram et al. | |
| 9,396,073 B2 | 7/2016 | Anglin et al. | |
| 10,248,677 B1 | 4/2019 | Visvanathan et al. | |
| 10,831,922 B1* | 11/2020 | Paterson | G06Q 20/206 |
| 2006/0271557 A1* | 11/2006 | Harward | G06F 9/45504 |
| 2007/0124603 A1* | 5/2007 | Yamamichi | G11B 20/00492 |
| | | | 713/194 |
| 2008/0256052 A1* | 10/2008 | Kar | G06F 16/3349 |
| 2011/0035813 A1* | 2/2011 | Trantham | G06F 21/78 |
| | | | 726/34 |
| 2015/0088754 A1 | 3/2015 | Kirsch | |
| 2018/0364917 A1* | 12/2018 | Ki | G06F 12/0246 |
| 2019/0179805 A1 | 6/2019 | Prahlad et al. | |

FOREIGN PATENT DOCUMENTS

WO    2014165451 A2    10/2014

\* cited by examiner

*Primary Examiner* — Edward J Dudek, Jr.
*Assistant Examiner* — Sidney Li
(74) *Attorney, Agent, or Firm* — Renaissance IP Law Group LLP

(57) ABSTRACT

A Key-Value Solid State Drive (KV-SSD) is disclosed. The KV-SSD may include storage for data. The data may include a data value encrypted using an object encryption key. The data value may be associated with an object key: the data value and the object key forming an object. A user secure object map may map the object key to a hash value. A secure key share table may map the hash value to the object encryption key. A dedup map may map the hash value to an address where the data value is stored on the KV-SSD.

23 Claims, 24 Drawing Sheets

520-1

User Secure Object Map

| Key | Hash |
|---|---|
| 100 <br> 410 | 8765 <br> 605 |
| 250 | 1234 |
| ⋮ | |

Secure Key Share Table

| Hash | Encryption Key | Share List | Access List |
|---|---|---|---|
| 8765 <br> 605 | Key 1 <br> 705 | User 1 <br> 710 | User 1 <br> 715 |
| 1234 | Key 1 | User 1, User 2 | User 1, User 2 |
| A2D2 | Key 2 | User 2 | User 2 |
| 9ABC | Key 2 | User 2 | User 2 |
| ⋮ | | | |

FIG. 7

Dedup Map

| Hash | Address | Count |
|------|---------|-------|
| 8765 <br> 605 | 0x3456 <br> 805 | 1 <br> 810 |
| 1234 | 0xBCDE | 2 |
| A2D2 | 0x1B68 | 1 |
| 9ABC | 0x4E22 | 1 |
| ⋮ | | |

SYSTEM, APPARATUS, AND METHOD FOR SECURE DEDUPLICATION

RELATED APPLICATION DATA

This application claims the benefit of U.S. Provisional Patent Application Ser. No. 62/950,105, filed Dec. 18, 2019, which is incorporated by reference herein for all purposes.

FIELD

The inventive concepts relate generally to storage systems, and more particularly to storage systems that support both security and data deduplication.

BACKGROUND

Key-Value Solid State Drives (KV-SSDs) provide an alternative way to store and access data. Instead of providing a Logical Block Address (LBA) that the SSD maps to a Physical Block Address (PBA) on the device, a host assigns a key to the data. Provided the key is unique relative to other keys on the KV-SSD, any data may be stored on the KV-SSD. This leads to a reduced set of instructions for the KV-SSD: typically, little more is needed than commands to store a value associated with a key (PUT), retrieve a value associated with a key (GET), and delete the value associated with a key (DELETE) (the specific commands names may vary).

KV-SSDs, just like block-based storage devices, may have redundant data stored thereon. That is, nothing prevents multiple users (or even the same user) from writing the same data multiple times under different keys. Thus, data deduplication is useful in KV-SSDs, just as in other types of storage devices.

But when security is added to the equation, the picture changes. With secure devices, the goal is that no user should know anything about another user's data. In general, one user should not even know what data another user has stored on the device, let alone what that data might be. But since data deduplication results in a single copy of any particular data being stored on the device, if multiple users use that same data, one user might change the data in a way that affects another user. This is an undesirable result.

A need remains to improve storage systems that support both security and data deduplication.

BRIEF DESCRIPTION OF THE DRAWINGS

FIG. 6 shows details of the user secure object map of FIG. 5.

FIG. 7 shows details of the secure key share table of FIG. 5.

DETAILED DESCRIPTION

Figure 1:
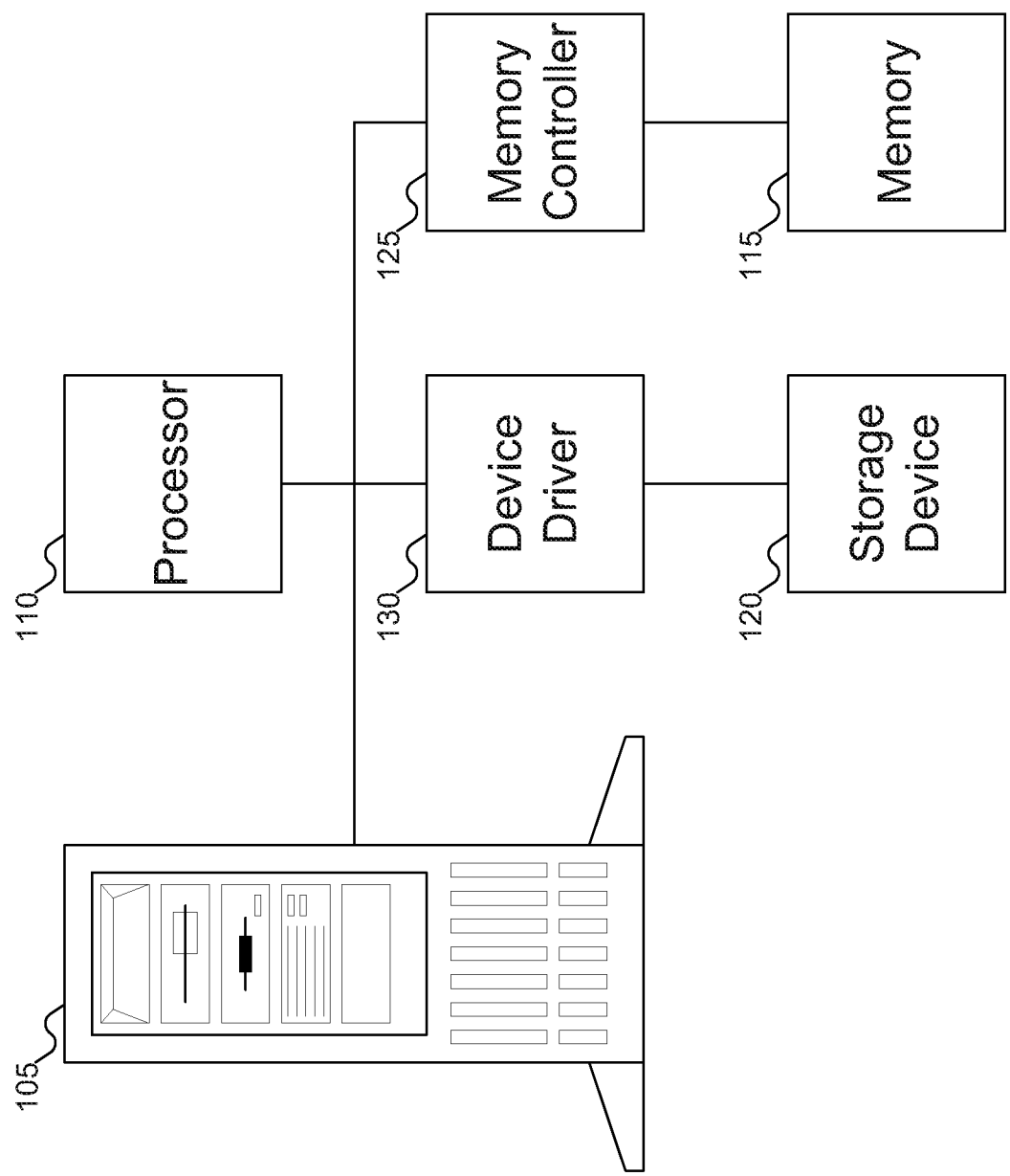
FIG. 1 shows a computer system including a secure dedup Key-Value Solid State Drive (KV-SSD), according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

The goal of a secure device is to let only the user who stored the data have access to that data. Other users should not even know that that user has stored any data on the device, let alone what the data actually is. In fact, other users should not even be able to determine that a particular data was written by a particular user. But a user should be permitted to share data with another user, giving that other user access to the same data.

Before getting into specifics, note that the term "key" has multiple meanings. A "key" may be used to encrypt/decrypt data. (While computer science may sometimes draw a distinction between the terms "key" and "password"—the former referring to a key that is computer-readable and the latter referring to a key that human-readable—for purposes of this discussion the terms may be considered interchangeable.) In general, such a key will be termed an "encryption key", even if the cryptosystem is a public-key cryptosystem that uses different keys to encrypt and decrypt data. On the other hand, a "key" may refer to the information used to identify a particular object on a KV-SSD. In general, such a key will be termed an "object key". In case the term "key" is used without a modifier, it is hoped that context will make it clear which type of key is intended.

In a secure KV-SSD (or any secure KV device, of which a KV-SSD is merely one example), to achieve security, data should be encrypted. Data may be encrypted using an encryption key that is unique to the object or a set of objects (but not necessarily applied to objects associated with a single user), unique to a user (but shared across at least some of the user's objects), or unique to the device (also called a device key). The device key may be self-generated at initialization time and should be unknown by any entity outside the device: even a device administrator should not be able to determine the device's encryption key (which therefore protects the data from being examined by an administrator).

Unencrypted content may be deduplicated as before: if there are two copies of an object, one copy may be replaced with just a pointer to the other object. But for encrypted data, data deduplication between two users who do not share data should not occur (since, as above, one user could guess the other user's data). Only if two users share data should data deduplication occur to save storage space.

Design goals include that an object table is encrypted by a user encryption key (to prevent other users from identifying which objects belong to the user). This user key may be provided by the user when the user first connects to the secure dedup KV-SSD: the user key is, ideally, not stored on the secure dedup KV-SSD (for security reasons): without the user key, there is no way to access the user's objects.

But merely connecting to the secure dedup KV-SSD and providing the user key is not enough: other information on the secure dedup KV-SSD may be encrypted using a (hidden) device key (that is, a device key known only to the device: not even an administrator may access the device key). This device key may be used to encrypt key tables, which identify which objects belong to which user.

As noted above, object data may be encrypted using any of a variety of keys: one specific to the object, one associated with a group of objects, one associated with the user who owns the object, and the device key.

Users may specify which other users may share a particular object. For that object, data deduplication is then permitted across that list of users who share the object.

A secure object maps include information about individual objects that belong to individual users. A secure object manager may access the secure object maps. The secure object map loaded in the secure object manager may include the ID—that is, the object key—for that object along with a hash value that is a hash of the data in an object. The secure object map may be encrypted using the user's encryption key: if the user does not provide the correct encryption key, the information in the secure object map manager may not be accessed.

Note that the secure object manager does not indicate where the object is stored in the secure dedup KV-SSD: that information is stored elsewhere. But the secure object manager permits a quick mapping from the hash value of the data to the object key to the hash value of the data, which may then be used for other purposes discussed below.

The location where the object is actually stored is found in the dedup map. The dedup map shows a mapping from hash values to specific addresses on the secure dedup KV-SSD. The dedup map may also store additional information. For example, as discussed above there may be multiple copies of a particular object stored on the secure dedup KV-SSD if the same data is stored by multiple users who do not share the data. But since the hash value of the data is unchanged by who stored the data, using just a hash value may not uniquely identify the correct object. So, the dedup map may also include a column for the ID of the user who stored the data. Other data may also be stored in the dedup map (but bearing in mind that if the dedup is not necessarily encrypted it may be important to not include certain data in the dedup map).

Aside from the dedup map, the secure dedup device may also include a secure key table. The secure key table may map between the hash value of objects stored on the secure dedup KV-SSD and the encryption key used to encrypt that data. Given a particular hash value, the appropriate encryption key for the data may be determined, so that the data (once accessed) may be properly decrypted. Like the dedup map, the secure key table may include additional columns to help prevent collisions in hash values for multiple copies of the same data that are not subject to deduplication. Since the encryption key used to encrypt data is necessary to properly access the data, the secure key table should be kept secure, encrypted, for example, using the device encryption key.

If only a single private key cryptosystem is used to encrypt data in the secure dedup KV-SSD, then storing only the encryption key used to encrypt a particular data may be enough to permit access to that data. If a public key cryptosystem is used, then both the encryption and decryption keys may need to be stored: the encryption key to encrypt data for when data is written to the secure dedup KV-SSD, and the decryption key for when data is read from the secure dedup KV-SSD. If multiple cryptosystems are used, then the secure key table may also need to specify the particular cryptosystem to be used. In the remainder of this document, the term "encryption key" is intended to refer to all the information needed to encrypt or decrypt a particular data, and may therefore encompass any combination of encryption key, decryption key (if different from the encryption key), and cryptosystem used.

Finally, the secure object share table stores information about which users share access to a particular object. By default, the fact that an object is shared, and who that object is shared with, is information that is not available to users. In fact, if a user does not have access to a particular object, the secure dedup KV-SSD should actually return an error if the user attempts to access the object, even if the user has the correct object key: this is discussed further below. If a particular object (identified by its hash value) is shared, the secure object share table may specify which objects are shared, and may list which users share access to the object. As with the dedup map and the secure key table, to avoid hash collisions, the secure key table may also include additional information, such as the user ID who stored the data identified by the hash value.

The secure object share table may exist inside or outside of KV-SSD. If it is inside of KV-SSD, it may be encrypted using the device encryption key. Otherwise, it may be encrypted using a storage system-level encryption key which may have similar properties like a device encryption key.

Note that while the above description suggests that the secure object share table is separate from the secure key table, other embodiments of the inventive concept may combine these two tables. For example, a common table (i.e., secure key share table) may store both the encryption key and the user share list. The hash values may be used as well to identify the specific data being represented. In yet another embodiment of the inventive concept, the secure object share table may be stored in the secure dedup device.

To optimize the space utilization, the hash value and owner information stored in dedup map may be merged with secure key table.

To support all of these operations, the secure dedup KV-SSD may also include a hash function. Any desired hash function may be used, although the selected hash function should avoid hash collisions (that is, two different data returning the same hash value). Mathematically, hash collisions may not be entirely avoidable (any function that maps from a domain that includes more entries than the range must necessarily map at least two different input values to the same output value), but if the range of the hash function is large enough and the hash function is properly implemented, the likelihood of a hash collision may be small enough to be acceptable. For example, a hash function that produces a 256-bit digest would have $2^{256}$ (more than $10^{77}$) different possible hash values. A 1 TB storage device that uses 4 KB blocks has $2^{28}$ total blocks, which means that the chance of a hash collision is $$\frac{2^{28}}{2^{256}} = \frac{1}{2^{(256-28)}} = \frac{1}{2^{228}} \cong 2 \times 10^{-69},$$

which is a very low probability.

To use a user's encryption key to access the user's secure object map, the object map may be loaded into the secure object manager by reading from storage the (encrypted) secure object map for the user and using the user key to decrypt the secure object map. The secure object map may then be stored in the secure object manager until the user is finished using the secure dedup KV-SSD, after which the secure object map may be encrypted using the user key and returned to storage.

In a multi-tenant secure dedup storage device, according to another embodiment of the inventive concept, whenever a device is opened or closed, a new token is issued. The device shares a pass with all active users, and any commands sent to the device must have a valid pass. If a pass is not valid, the commands are rejected. The device may also issue a new private key for each active user using an ID attribute-based encryption (ABE).

To share data with another user, if a given data exists for the user, the appropriate cipher key may be returned. Otherwise, write the value into an object and return a cipher key. To unshare data, if a given a cipher key exists, it may be unshared for the given user.

Returning to general operations of the secure dedup KV-SSD, at device initialization device specific information may be used to self-generate a device encryption key. As discussed above, this device encryption key may be unknown and inaccessible to even the administrator of the device. Given this device encryption key, the secure key table may be decrypted and re-encrypted to load the key table into local storage and return it to secure storage. As the secure key table may store information about the encryption key used to access individual objects, the information in the secure key table, once decrypted, may be used encrypt an object when written to the secure dedup KV-SSD and to decrypt the object when read from the secure dedup KV-SSD.

For a user to gain access the secure dedup KV-SSD, the user may provide the user's ID and user password to the host computer system. (A "password" is frequently understood to mean something that is user-readable, and which may be less secure than a randomly generated bit sequence that may be considered an "encryption key". Thus, while the terms "password" and "encryption key" may be synonymous in some embodiments of the inventive concept, in other embodiments of the inventive concept the user password is used by the host computer to determine a stored user encryption key that is more secure than the user password, and it is this user encryption key that is then provided to the secure dedup KV-SSD.) Assuming the correct user ID and user password have been provided, the host computer system may then provide the user key to the secure dedup KV-SSD. This may be done in a secure manner (to prevent someone from intercepting the user key): for example, using the Diffie Hellman key exchange protocol. Once the secure dedup KV-SSD has received the user key from the host computer system, the secure dedup KV-SSD may decrypt the secure object map for the user.

Upon receiving a message that the user has logged out of the secure dedup KV-SSD, the device may encrypt the user's secure object map using the user key and return it to secure storage. Then the device may purge the user key and the secure object map from local storage.

To write a new object to the device, the device may first calculate a hash value of the data. The device may then update the secure object map for the user to reflect the new or updated hash value (the hash value may be an update if an object with the provided object key already exists for the user on the device). The device may then forward the data and the hash value to the secure dedup manager (because the location where the data is actually stored may be managed within the secure dedup manager).

The secure dedup manager may then decrypt the secure key table using the device key. Given the hash value (and possibly the user ID), the secure key table and the dedup map may be checked to see an entry exists for that hash value to which the user has access. If no entry already exists for this hash value (and possibly this user ID), then new entries may be created in the secure key table, the secure object share table, and the dedup map. The data may then be encrypted using the appropriate encryption key for the object and written to the secure object storage, the secure key table may be updated to reflect the new hash value and object encryption key, and the dedup map may be updated to identify the address where the secure dedup KV-SSD stores the object. The dedup map may also reflect a reference count of 1 (this count, not discussed earlier, may represent how many different object keys there are that refer to the same data). The secure object share table may also be updated to create an entry for the hash value (and possibly the user ID) for later sharing purposes: for now, the secure object share table may reflect that the object is not shared with any other users.

On the other hand, if an entry already exists for this hash value (and assuming that the user either owns the object or is on the share list) in the secure key table and the dedup map and the user has access to the data, then the reference count in the dedup map may be incremented by one to reflect another reference to the data, and the secure object share table may be updated to reflect that the user has accessed the data.

Note that in the secure key share table, two different lists may exist. One list may identify the users who are permitted to share the object: the other list may identify the users who are actually sharing the object. But just because a user has permission to share the object does not mean that the user actually has written data to the secure dedup KV-SSD. For example, consider a document stored as an object on the secure dedup KV-SSD. By e-mailing a copy of this document to another user, that other user may be given permission to access the object. But until the other user actually stores the document on the secure dedup KV-SSD, that user is not actually sharing the object. It is only when the other user actually stores the document that the other user is actually sharing the object (since deduplication would avoid multiple copies of the document being stored on the secure dedup KV-SSD). Thus, the list of users who are actually using the object may differ from the list of users who have permission to share the object. In some embodiments of the inventive concept, the list of who is actually sharing the object may be stored in the dedup map (although as the dedup map is not necessarily secure, storing this information in the dedup map may necessitate encrypting the dedup map).

Another point worth considering is what happens when data is being updated. If an object belongs to only one user, or only one user is actually sharing the object even though other users might have permission to share the object, the original data may be safely discarded when the object is updated. After all, if there is only one user who is actually using the object and that user chooses to update the object, that user obviously does not care are the original data. (If the user cared about the original data, the user would either store the updated data with a new object key or would make a copy of the original data under a new object key first.) But where more than one user is actually sharing the object, the question of whether an update should cause the original object to be lost or not is trickier, and may be implemented using a policy decision. In one embodiment of the inventive concept, the original object data may be replaced by the new object data (just as in the case where only one user has access to the data). The premise behind this embodiment of the inventive concept is that users who are sharing access to the same data are aware that the other users with access may change the data. In another embodiment of the inventive concept, the original data may be retained somehow and the new data stored in a new object (perhaps with the user having to provide a new object key). The premise behind this embodiment of the inventive concept is that the different users may have each wanted their own copy of the data, but deduplication may have merged their copies. In this situation, the other users may want to keep the original data rather than seeing the updated data.

To read an object from the device, the device may first look to see if the object key is listed in the user's secure object map. If the object is not listed in the user's secure object map, then the secure dedup KV-SSD may return an error. Note that this error may be returned even though an object with that object key may actually exist on the secure dedup KV-SSD.

Assuming that the user has access to an object with the provided object key, the secure dedup KV-SSD may access the hash value from the user's secure object map, and may pass that hash value to the secure dedup manager (again, because the secure dedup manager has access to the dedup map that stores the address where the object is actually stored). The secure dedup manager may then decrypt the secure key table using the device encryption key. From the decrypted secure key table, the secure dedup manager may identify the encryption key used to encrypt the object. Note that this encryption key might belong to another user if the object is shared: thus, the user requesting to read the data might not actually have access to the encryption key directly. From the dedup map, the secure dedup manager may determine the address at which the object is stored.

The secure dedup manager then checks that the object is actually stored at the address specified in the dedup map, and that the user has access to the object from the secure key table. In theory, these two checks should always return positive results: if the object key is found in the user's secure object map, then the object should exist and the user has access to the object. But the possibility exists that some data corruption could occur, and these checks provide protection against that possibility. Then, using the address where the object is stored from the dedup map and the encryption key for the object from the secure key table, the secure dedup manager may decrypt the object and return the data to the host computer system.

To delete an object from the secure dedup KV-SSD, given the object key of the object the user wants to delete, the secure dedup KV-SSD may check the user's secure object map to see if the user has access to the object. If not, then the secure dedup KV-SSD may return an error.

Otherwise, if the user has access to the object, the secure dedup KV-SSD may access the hash value for the object, and may remove the entry from the user's secure object map. The hash value may then be forwarded to the secure dedup manager (again, because the secure dedup manager has access to the dedup map that stores the address where the object is actually stored). The secure dedup manager may then decrypt the secure key table using the device encryption key. The secure dedup manager may also access the address of the object from the dedup map. The secure dedup manager then determines if the user had access to the object according to the secure key table. If not, then something unusual has occurred (because if the user had access to the object according to the user's secure object map, the user should also have access to the object according to the secure key table).

Assuming that the secure key table indicates that the user has access to the object, the reference count for the object may be decremented by 1 to reflect that the user has deleted his access to that object. The secure dedup manager may also update the secure key table (or the secure object share table) to reflect that that user is no longer accessing the object (even though the user might still have permission to access the object).

The secure dedup manager may then determine if the reference count for the object is 0. If the reference count for the object is 0, that fact indicates that there are currently no users accessing the object. In that case, the secure dedup manager may delete the entries for the hash value from the secure key table, the secure object share table, and the dedup map, and may actually delete the object itself.

From all of this discussion, it should be apparent that embodiments of the inventive concept permit data access controlled deduplication. The user's secure object map is encrypted by a user key. Only users who have an access privilege can access the deduplicated object.

The secure deduplication is based on a variant message-locked encryption. There is one encryption key per document, which may be assigned dynamically or statically. The object encryption key may be selected by the hash value of message, IDX(H(M)), which means that encryption is a function of E(K, IDX(H(M))). Cross-user deduplication is possible for secure objects shared by the users (but not for secure objects for which the users do not share access): one object can be shared by multiple users.

User objects are accessible to the owner of the object (using the user's secure object map, which is encrypted with a user key provided by the user). Other users may not know which objects belong to a user (the encryption keys used to encrypt the objects are themselves are encrypted with a hidden device key). The object content is encrypted (possibly with a hidden device encryption key). By default, a user does not know whether an object is shared, or who has access to an object (again, because the encryption keys are encrypted and sharing information is hidden). Each user has separate control over who can share access to the user's objects: deduplication is allowed only across those users. Finally, the user key is known to only the owner and is not stored in dedup storage, and even an administrator may not decrypt object contents because the objects are encrypted using a device key that is generated at initialization (and the administrator has no access to that device key).

FIG. 1 shows a computer system including a secure dedup Key-Value Solid State Drive (KV-SSD), according to an embodiment of the inventive concept. In FIG. 1, computer system 105, which may be a host computer, may include processor 110, memory 115, and storage device 120. Processor 110 may be any variety of processor: for example, an Intel Xeon, Celeron, Itanium, or Atom processor, an AMD Opteron processor, an ARM processor, etc. While FIG. 1 shows a single processor 110, computer system 105 may include any number of processors, each of which may be single core or multi-core processors, and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system under which various applications may be running. These applications may issue requests to read data from or write data to either memory 115 or storage device 120. Whereas memory 115 may be used to store data that may be termed "short-term", storage device 120 may be used to store data that is considered "long-term": that is, data expected to be stored for extended periods of time. Storage device 120 may be accessed using device driver 130. Storage device 120 may be of any desired format, such as hard disk drives, Solid State Drives (SSDs), and any other desired format, but may be intended to be a secure storage device, may support deduplication, and may offer a key-value interface (rather than a block-based interface).

Figure 2:
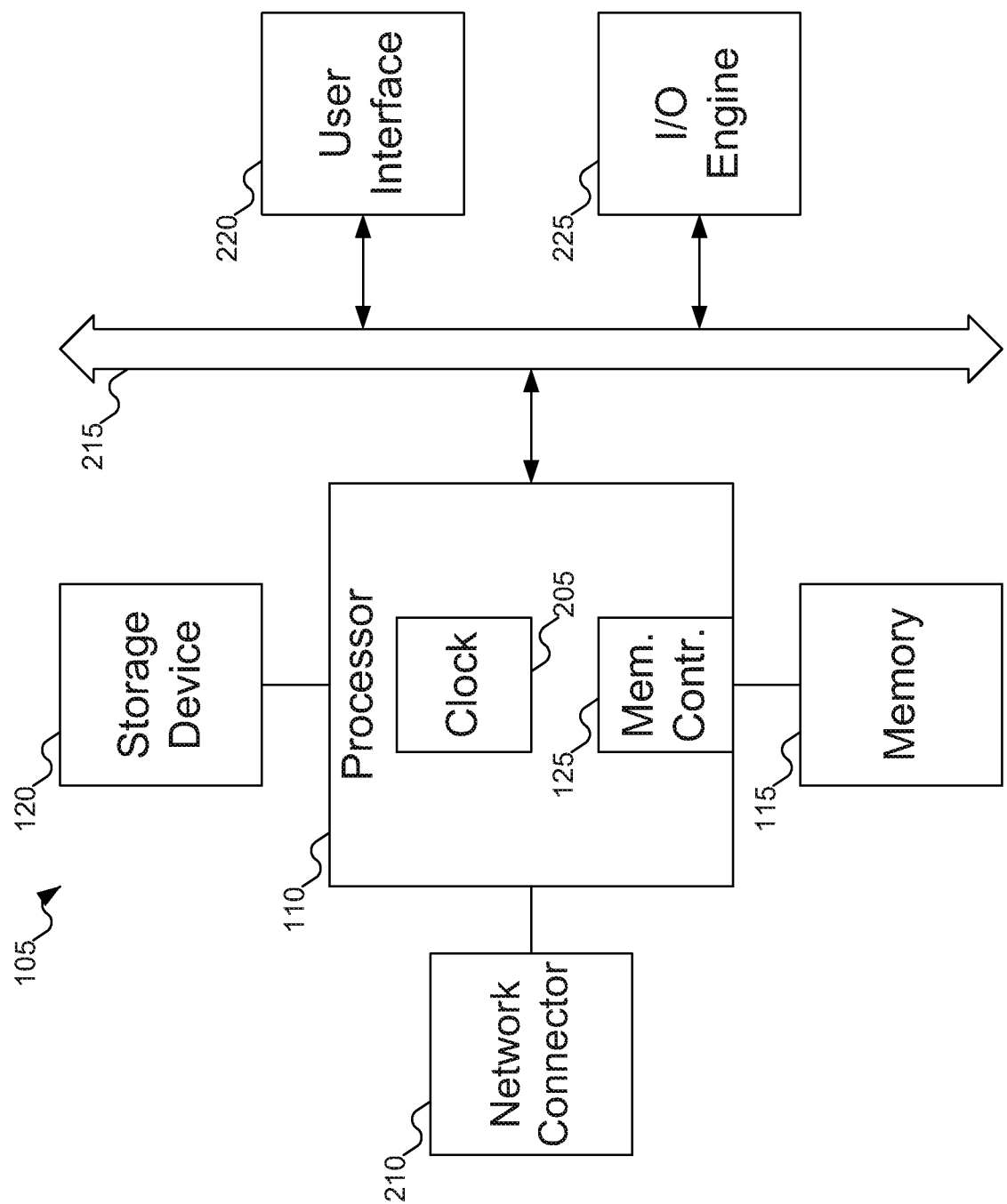
FIG. 2 shows details of the computer system of FIG. 1.

FIG. 2 shows details of computer system 105 of FIG. 1. In FIG. 2, typically, computer system 105 includes one or more processors 110, which may include memory controllers 125 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 120, and to network connector 210, which may be, for example, an Ethernet connector or a wireless connector. Processors 110 may also be connected to buses 215, to which may be attached user interfaces 220 and Input/Output interface ports that may be managed using Input/Output engines 225, among other components.

Figure 3:
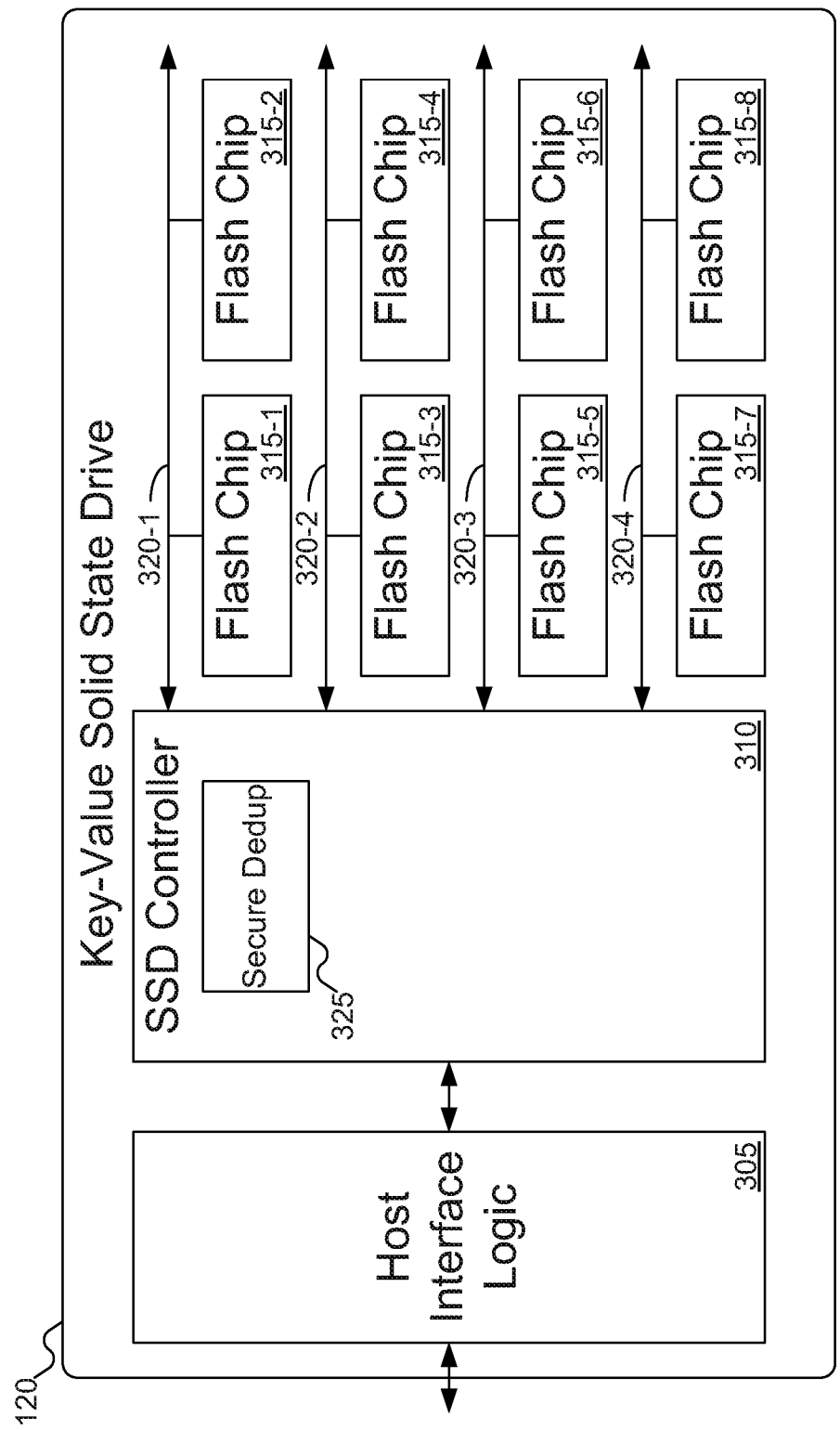
FIG. 3 shows details of the KV-SSD of FIG. 1.

FIG. 3 shows details of KV-SSD 120 of FIG. 1. In FIG. 3, KV-SSD 120 may include host interface logic (HIL) 305, SSD controller 310, and various flash memory chips 315-1 through 315-8 (also termed "flash memory storage"), which may be organized into various channels 320-1 through 320-4. Host interface logic 305 may manage communications between KV-SSD 120 and other components (such as processor 110 of FIG. 1). These communications may include read requests to read data from KV-SSD 120, write requests to write data to KV-SSD 120, and delete requests to delete data from KV-SSD 120. Host interface logic 305 may manage an interface across only a single port, or it may manage interfaces across multiple ports. Alternatively, KV-SSD 120 may include multiple ports, each of which may have a separate host interface logic 305 to manage interfaces across that port. Embodiments of the inventive concept may also mix the possibilities (for example, an SSD with three ports might have one host interface logic to manage one port and a second host interface logic to manage the other two ports).

SSD controller 310 may manage the read and write operations, along with garbage collection and other operations, on flash memory chips 315-1 through 315-8 using a flash memory controller (not shown in FIG. 3).

In a block-based storage device, particularly a block-based SSD, the host may assign a logical block address (LBA) to data, which a storage device may map to a physical block address (PB A). The storage device may maintain a record of these mappings, freeing the SSD and the host from having to ensure that the host is kept up-to-date on the current PBA of data. The host simply uses the LBA; the storage device maps the LBA to a PBA and returns the appropriate information. If data is moved internally to the storage device (as might happen during, for example, data overwrite or garbage collection on SSDs), such data movement is transparent to the host (with the mapping being updated with the new PBA of the data). Such structures that map LBAs to PBAs may be termed translation layers (or, particularly in the context of SSDs and other devices that use flash storage) flash translation layers.

KV-SSDs, in contrast, manage data differently. Rather than data being assigned an LBA, data (also called a value or data value) may be assigned a key (also called an object key). While this might seem to be nothing more than a terminology change ("object key" replacing "LBA"), there are other differences between keys and object LBAs (and between KV-SSDs and block-based SSDs). The size of a block in a block-based SSD is fixed at the time of manufacturer. For example, in a block-based SSD that has blocks of 4 KB, every block is 4 KB in size: there is no flexibility. This fact means that LBAs are also divided into 4 KB units to effectively map to the blocks on the SSD. KV-SSDs, on the other hand, permit flexible sizes for the data values. For example, value sizes might range from 0 B to 2 MB. In addition, object key sizes may also vary: for example, from 4 B to 255 B. These arrangements permits more flexibility in how data is stored than may be offered by a block-based SSD.

Thus, instead of a flash translation layer, KV-SSD 120 might include some sort of mapping from object key to address where the data value is stored. But the introduction of security and deduplication, both alone and in combination, complicate the picture.

For KV-SSD 120 to be secure, the data values should be protected against access by anyone other than an authorized user. This fact means that if an unauthorized user were to attempt to read the data value associated with an object key or to delete the object key, KV-SSD 120 should return an error, even if an object with that data key has been stored on KV-SSD 120. Furthermore, the KV-SSD should permit a user to store an object with a particular object key, even if another user has stored an object with the same object key. In a conventional KV-SSD, this operation would result in overwriting the old data value with the new data value: but for the same reason that one user should not be able to read another user's data values, neither should one user be permitted to overwrite another user's data values. Nor can KV-SSD 120 return an error (as a "collision" of object keys), since that result would inform the user attempting to write the object to KV-SSD 120 that an object already exists with that key, which would be contrary to the desired security. (The solution to this latter problem is to somehow map the combination of the object key and an identifier associated with the user to a unique key: for example, by concatenating the two pieces of data and/or hashing them together to generate a unique (to KV-SSD 120) key.)

Data deduplication, on the other hand, recognizes that the same data might be stored multiple times on KV-SSD 120, and only one such copy should be stored to reduce the footprint on the available storage capacity. For example, multiple people might store copies of the same document on KV-SSD 120. Data deduplication could be limited to data deduplication solely within the namespace of a particular user, but this choice would limit the benefit offered by data deduplication. On the other hand, if data deduplication is performed across users, then one user could change another user's data, which would be contrary to the desire for security.

To handle security and data deduplication, SSD controller 310 may include secure dedup 325. Secure dedup 325 is discussed further with reference to FIG. 5 below, which explains how both security and data deduplication may be achieved to maximum benefit.

While FIG. 3 shows KV-SSD 120 as including eight flash memory chips 315-1 through 315-8 organized into four channels 320-1 through 320-4, embodiments of the inventive concept may support any number of flash memory chips organized into any number of channels. Similarly, while FIG. 3 shows the structure of a KV-SSD, other storage devices (for example, hard disk drives) may be implemented using a different structure, but with similar potential benefits, to include both security and data deduplication.

Figure 4:
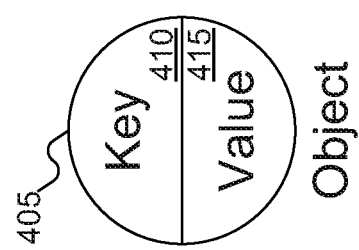
FIG. 4 shows the elements of an object that may be stored on the KV-SSD of FIG. 1.

FIG. 4 shows the elements of an object that may be stored on KV-SSD 120 of FIG. 1. In FIG. 4, object 405 is shown. Object 405 includes object key 410 and data value 415. Object key 410 may be used to identify data value 415. Thus, when object 405 is written to KV-SSD 120 of FIG. 1 (which may be called a PUT command, although other command names may be used), both object key 410 and data value 415 may be provided; when object 405 is read or deleted from KV-SSD 120 of FIG. 1 (which may be called GET and DELETE commands, respectively, although other command names may be used), object key 410 may be provided so that data 415 may be located within KV-SSD 120 of FIG. 1.

Figure 5:
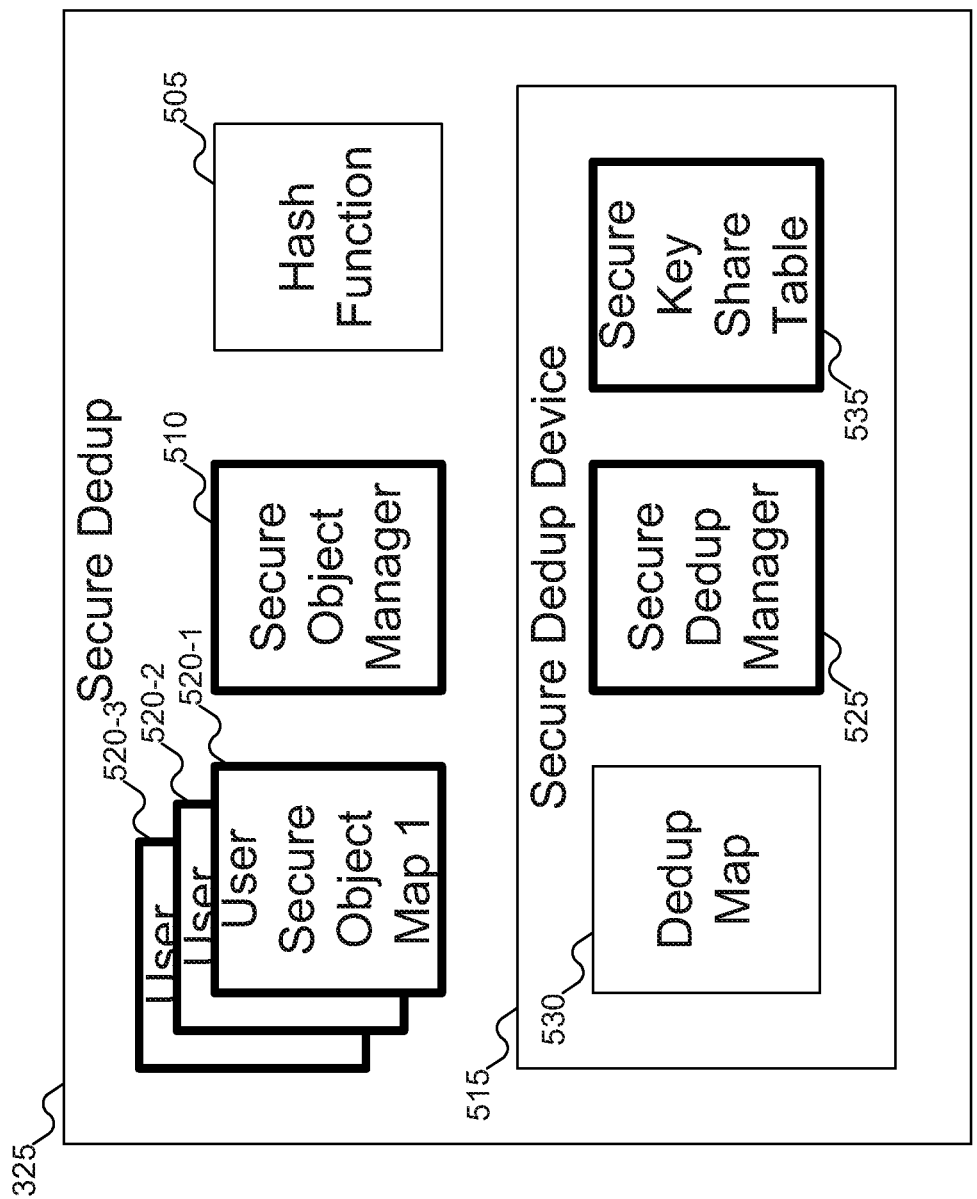
FIG. 5 shows details of the secure dedup module of FIG. 3.

FIG. 5 shows details of secure dedup module 325 of FIG. 3. In FIG. 5, secure dedup module may include hash function 505, secure object manager 510, and secure dedup device 515. Hash function 505 may be used to generate a hash value of data value 415 of FIG. 4 for object 405 of FIG. 4: the use of this hash value is discussed further with references to FIGS. 6-8 below.

Secure object manager 510 may access user secure object maps 520-1, 520-2, and 520-3. Each user secure object map 520-1, 520-2, and 520-3 may be a secure object map for a particular user. As discussed further with reference to FIG. 6 below, user secure object maps 520-1, 520-2, and 520-3 may store information about objects within a particular user's namespace—that is, the objects to which a particular user has access.

Secure object manager 510 may load and unload user secure object maps 520-1, 520-2, and 520-3 from local storage as needed (that is, as users log in and out from computer system 105): when loaded into secure object manager 510, user secure object maps 520-1, 520-2, and 520-3 may be stored in local memory, which may be (for example) either volatile or non-volatile storage and may be of any type, such as flash storage, DRAM, etc. When not loaded in secure object manager 510, user secure object maps 520-1, 520-2, and 520-3 may be stored in ordinary storage on KV-SSD 120 (that is, on flash memory chips 315-1 through 315-8 of FIG. 10), or they may be stored in reserved storage (that is, in storage where ordinary user data might not be stored).

Secure dedup device 515 may handle both secure access to data values and data deduplication as permitted within the limits of security. Secure dedup device 515 may include secure dedup manager 525, dedup map 530, and secure key share table 535. Secure dedup manager 525 may actually perform the operations to manage access to data values stored on KV-SSD 120 of FIG. 1. Specifically, secure dedup manager 525 may determine which users are permitted to write, read, and delete various objects, and how the data values for those objects are protected against unwanted access. Secure dedup manager 525 may use secure key share table 535, which may identify which users may access which objects and how the data values for those objects are protected, and dedup map 530, which may identify where the data values for objects are stored. Secure key share table 535 is discussed further with reference to FIG. 7 below; dedup map 530 is discussed further with reference to FIG. 8 below.

Secure dedup manager 525 may load and unload secure key share table 535 and dedup map 530 from local storage as needed (that is, as data is needed from these structures): when loaded into secure dedup manager 525, secure key share table 535 and dedup map 530 may be stored in local memory, which may be (for example) either volatile or non-volatile storage and may be of any type, such as flash storage, DRAM, etc. When not loaded in secure dedup manager 525, secure key share table 535 and dedup map 530 may be stored in ordinary storage on KV-SSD 120 (that is, on flash memory chips 315-1 through 315-8 of FIG. 10), or they may be stored in reserved storage (that is, in storage where ordinary user data might not be stored).

A careful reader may notice that user secure object maps 520-1, 520-2, and 520-3, secure object manager 510, secure dedup manager 525, and secure key share table 535 are surrounded by thicker lines than the other components. These thicker lines may represent that these components may contain sensitive data that should be protected against unwanted access. For user secure object maps 520-1, 520-2, and 520-3, and secure key share table 535, this protection may include the data being encrypted. But since the data in these data structures may be decrypted to be used secure object manager 510 and secure dedup manager 525, secure object manager 510 and secure dedup manager 525 may also be secured against external access. That is, secure object manager 510 and secure dedup manager 525 may receive specific commands and respond accordingly, but should information within their structures should not be accessible. For example, secure object manager 510 and secure dedup manager 525 should not permit an external process or device (even one within KV-SSD 120 of FIG. 1) to read any data stored internally to the structures of secure object manager 510 and secure dedup manager 525.

Note that the above discussion does not indicate that dedup map 530 is secure: for example, that it is stored encrypted. The information in dedup map 530 is of minimal value in determining anything useful about objects stored on KV-SSD 120 of FIG. 1, and therefore may be stored unencrypted. But in some embodiments of the inventive concept dedup map 530 may be encrypted as well. Further, while FIGS. 6-8 describe particular data being stored in each of user secure object maps 520-1, 520-2, and 520-3, secure key share table 535, and dedup map 530, provided that enough information exists to successfully write, read, and delete objects on KV-SSD 120 of FIG. 1, it matters little which data structures store what information. Thus, in some embodiments of the inventive concept information may be moved among these data structures, or the data structures combined to be fewer in number. For example, secure key share table 535 and dedup map 530 may be combined into a single data structures, and theoretically could even be combined with user secure object maps 520-1, 520-2, and 520-3. Or, secure key share table 535 might be combined with user secure object maps 520-1, 520-2, and 520-3. Or, the various tables could be broken into a greater number of tables (for example, a share list for a particular object might be stored in a secure object share table rather than in secure key share table 535. All combinations of combining these various data structures, in whole or in part, are considered to be embodiments of the inventive concept, as are all possible arrangements of data stored in these data structures. (Of course, if data about objects that is sensitive is stored in dedup map 530, then dedup map 530 may be encrypted to secure the objects stored on KV-SSD 120 of FIG. 1).

Having discussed that user secure object maps 520-1, 520-2, and 520-3, secure key share table 535, and dedup map 530 may be encrypted, it becomes important to discuss how they might be encrypted. The specifics of the encryption algorithm are not important: any encryption algorithm that provides adequate security may be used. For example, the Data Encryption Standard DES, with a 56-bit key, might be considered secure in some embodiments of the inventive concept, but insufficiently secure in other embodiments of the inventive concept, where other encryption algorithms may be used instead. More important than the encryption algorithm is the question of the encryption key used by the encryption algorithm.

User secure object maps 520-1, 520-2, and 520-3 may store information that is specific to the individual users associated with those maps. Thus, a user key that is specific to the user may be used to encrypt these data structures. These user keys, for security reasons, might not be stored on KV-SSD 120 of FIG. 1. Thus, every time the user logs in to computer system 105 of FIG. 1, computer system 105 of FIG. 1 may provide the user key to KV-SSD 120, thereby enabling secure object manager 510 to decrypt the appropriate user secure object map. When the user logs out of computer system 105 of FIG. 1, computer system 105 of FIG. 1 may send a message to KV-SSD 120 of FIG. 1 of this fact, so that secure object manager 510 may re-encrypt the user secure object map using the user's key and writing the re-encrypted user secure object map back to its storage. After secure object manager 510 has stored the encrypted user secure object map, secure object manager 510 may then purge any record of the (decrypted) user secure object map and (more importantly) the user key from its local storage, which may prevent an unwanted party from gaining access to such information.

But whereas each user secure object map stores information that is specific to the user, secure key share table 535 may store data across multiple users. Thus, it would be undesirable for secure key share table 535 to be encrypted using any individual user key: that choice would mean that each user would have to share the same user key and/or that one user might be able to access data to which that user should not have access. Thus, secure key share table 535 may be encrypted using a device encryption key, known only to KV-SSD 120 of FIG. 1. Ideally, the device encryption key should not even be accessible from outside KV-SSD 120 of FIG. 1: even a system administrator may be denied access to the device encryption key (thereby preventing even the system administrator from circumventing the protections offered by secure dedup 325). The generation of the device encryption key is discussed further with reference to FIG. 9 below.

Of course, the device encryption key could be used to encrypt user secure object maps 520-1, 520-2, and 520-3. But provided no information that crosses users is stored in user secure object maps 520-1, 520-2, and 520-3 (for example, which other users might be permitted to access a particular object), there are two advantages to using user keys to encrypt user secure object maps 520-1, 520-2, and 520-3. First, since different user keys may be used to encrypt different user secure object maps, no single key (such as the device encryption key) could be used to expose information from other user secure object maps. Second, since user keys may not be stored on KV-SSD 120 of FIG. 1 (but instead may be provided to KV-SSD 120 of FIG. 1 by computer system 105 of FIG. 1 when the user logs in to computer system 105 of FIG. 1), the user keys may not be determined even by examining the data on KV-SSD 120 of FIG. 1

FIG. 6 shows details of user secure object map 520-1 of FIG. 5. In FIG. 6, user secure object map 520-1 is shown as a table including various entries. For example, one entry in user secure object map 520-1 pairs object key 410 with hash value 605. Other columns may also be stored in user secure object map 520-1 as desired. Thus, given a particular object key, the hash value (and potentially other data) associated with this object key may be determined. For searching purposes, user secure object map 520-1 may include one or more index columns. While FIG. 6 shows user secure object map 520-1 as a table, embodiments of the inventive concept may store the mapping between object key 410 and hash value 605 using any other desired data structures. Most further operations within secure dedup device 515 of FIG. 5 rely on hash value 605 rather than object key 410.

Like the "name change" from LBA to object key, mapping from object key 410 to hash value 605 may seem unnecessary: one identifier is simply being "swapped" for another. The reason that user secure object map 520-1 maps from object key 410 to hash value 605 is a consequence of data deduplication. When duplicate data is stored on a storage device such as KV-SSD 120 of FIG. 1, that duplicate data is frequently given different identifiers (such as file names). With key-value storage devices, such as KV-SSD 120 of FIG. 1, objects are expected to have different object keys (just like two files in a standard computer file system must have unique fully qualified file names factoring in both the file name itself and the path from the root folder). But if data is truly duplicated (that is, identical), then a hash value of the data would be the same regardless of what object key or fully qualified file name is attached to the data. For example, a file that contains the data "abc123" will produce the same hash value regardless of whether the file is called "mytext.doc" or "Iloveyou.song" (or whether the object key has the value "12345" or "987654321"). Thus, while object keys may be unique regardless of the data in the object, hash values of the data should be different only if the data itself are different. By working with the hash value rather than the object key, data deduplication may be performed and KV-SSD 120 of FIG. 1 may still be able to locate any data given its object key.

A follow-up point is why the mapping from object key to hash value is stored in user secure object map 520-1, rather than in some other more shared data structure. As discussed above with reference to FIG. 5, this mapping may be stored elsewhere, such as in secure key share table 535 of FIG. 5 of dedup map 530 of FIG. 5 (as examples). But by storing the mapping from object key to hash value in user secure object map 520-1, an additional protection against a user gaining access to an object that they should not be permitted to access is introduced. If the object key provided is not in user secure object map 520-1, then that user should not have access to that object. (There is an exception to this rule in some embodiments of the inventive concept, as discussed further with reference to FIG. 12 below.)

FIG. 7 shows details of secure key share table 535 of FIG. 5. In FIG. 7, secure key share table 535 is shown as a table including various entries. For example, one entry in secure key share table 535 pairs hash value 605 with object encryption key 705, share list 710, and access list 715. Not all columns shown in secure key share table 535 are needed, and other columns may also be stored in secure key share table 535 as desired. Thus, given a particular hash value, object encryption key 705 used to encrypt the data value for that object may be determined, along with the list of users who are permitted to share the object (share list 710) and the list of users who are actually sharing the object (access list 705). For searching purposes, secure key share table 535 may include one or more index columns. While FIG. 7 shows secure key share table 535 as a table, embodiments of the inventive concept may store the mapping between hash value 605 and share list 710, access list 715, and object encryption key 705 using any other desired data structures.

The reason secure key share table 535 stores a mapping from hash value 605 to object encryption key 705 is that the encryption key used to encrypt the data might not be one associated with the user attempting to access the object. For example, consider the following situation. User 1 writes an object to KV-SSD 120 of FIG. 1 (assume this object represents a document). Because KV-SSD 120 of FIG. 1 is secure, the data value of this object may be encrypted using encryption key key), which may be an encryption key created by User 1. User 1 then shares this object with User 2, perhaps by e-mailing the document to User 2. Now assume User 2 writes the same object to KV-SSD 120 of FIG. 1. Because KV-SSD 120 of FIG. 1 offers data deduplication and by virtue of the facts that the object has been shared between Users 1 and 2 and that the data is unchanged, KV-SSD 120 of FIG. 1 may simply point the object key assigned by User 2 to the existing copy of the object (rather than storing a fresh copy encrypted using encryption key $key_2$, which may be an encryption key created by User 2). But when User 2 attempts to read the object from KV-SSD 120 of FIG. 1, since their encryption key is $key_2$, they would not be able to successfully decrypt the data (which was encrypted using key)). But by storing a mapping from hash value 605 to object encryption key 705, KV-SSD 120 of FIG. 1 may determine the actual encryption key used to encrypt the data written to KV-SSD 120 of FIG. 1, and may use that encryption key to decrypt the data for a different user who has permission to access the object (for example, a user whose identifier is on share list 710).

One consequence of the fact that KV-SSD 120 of FIG. 1 may use hash value 605 to determine whether data is duplicated or not is that the data being hashed should be the same. But if the encrypted version of the data were hashed using hash function 505 of FIG. 5, then it is virtually certain there would be no data deduplication between different users' copies of the same data (the encrypted versions would hash to different hash values even if the unencrypted data were the same). Since embodiments of the inventive concept may perform data deduplication across users (or at least, across users who share access to objects that may be deduplicated), hash function 505 of FIG. 5 may be applied to the raw (unencrypted/decrypted) data in the object. Note that this is not a potential weakness in security, since hash functions are generally not reversible: given a hash value, it is generally not possible to reconstruct the original data. (Of course, if a hash function that were reversible were used, then the original data could be recovered, so either a one-way hash function (which is not reversible) should be used or else the hash values as stored in user secure object map 520-1 of FIG. 6 and dedup map 530 of FIG. 8 (discussed below) should be protected by encryption to maintain security.)

Object encryption key 705 may be any desired encryption key, and may be applied to any desired set of objects. Thus, for example, object encryption key 705 may be unique to the object identified by hash value 605: no other object might use object encryption key 705 to encrypt/decrypt data (as FIG. 7 shows an object with a hash value of "1234" also using the same encryption key as object encryption key 705, this embodiment of the inventive concept is obviously not shown in FIG. 7). Or, object encryption key 705 may be used to encrypt/decrypt a set of objects: this set of objects may include objects written only by a single user, or it may include objects written by multiple different users. Or, object encryption key 705 may be used to encrypt/decrypt belonging to a single user (and might be the same as the user key or a different encryption key). Or, object encryption key 705 may be used to encrypt/decrypt all objects on KV-SSD 120 of FIG. 1 (as FIG. 7 shows objects using a different encryption key, this embodiment of the inventive concept is obviously not shown in FIG. 7). Furthermore, these different variations may be combined in any manner desired. For example, one object might have a key that is unique to that object, another set of objects might share a single encryption key, and so on.

One way to generate object encryption key 705 is to generate object encryption key 705 as a function of hash value 605. A model where object encryption key 705 is generated as a function of hash value 605 may be referred to as message-locked encryption. That is, if M represents the (plaintext) data, C represents the (cyphertext) data, H0 represents a hash function, IDX( ) represents an encryption key generation function, E( ) represents an encryption function, and D0 represents a decryption function, then the values of C and M may be related using the equations C=E(M, IDX(H(M))) and M=D(C, IDX(H(M))).

Although object encryption key 705 could be generated as a function of hash value 605, there are problems with such a straightforward approach. The encryption key generation function would need to be deterministic—that is, given the same hash value 605, the encryption key generation function would need to produce the same object encryption key 705. But if the encryption key generation function is deterministic and known, and hash value 605 is not protected, then anyone who could access hash value 605 (for example, from dedup map 530 of FIG. 5, which is not necessarily encrypted) could determine the encrypting function. Thus, a better approach might be to generate a random encryption key for each document (which random encryption keys may be stored securely somewhere within secure dedup 325 of FIG. 5), and for the encryption key generation function to index into this set of random encryption keys. In this manner, there is no pre-determined relationship between hash value 605 and any specific object encryption key 705. (This variation also means that instead of secure key share table 535 storing object encryption key 705 directly, secure key share table 535 might just store a pointer to where the encryption key is actually stored, or might even not store anything at all but instead rely on the encryption key generation function to map to hash value 605 to the appropriate random encryption key.)

Share list 710 and access list 715, as mentioned above, represent lists of users who are permitted to access the object whose data hashes to hash value 605 and users who are actually accessing the object whose data hashes to hash value 605. As may be expected, access list 715 should be a subset of share list 710: that is, it should not happen that a user who is not permitted to share the object may access the object. Note that both lists are not necessarily needed: relying on the fact that any user who is actually accessing the object should have an entry in user secure object map 520-1 of FIG. 5, access list 715 may be omitted. While share list 710 and access list 715 are described as lists, any data structure may be used to store which users are permitted to share and/or are accessing the object: further, different data structures may be used for each list.

Figures 8, 9:
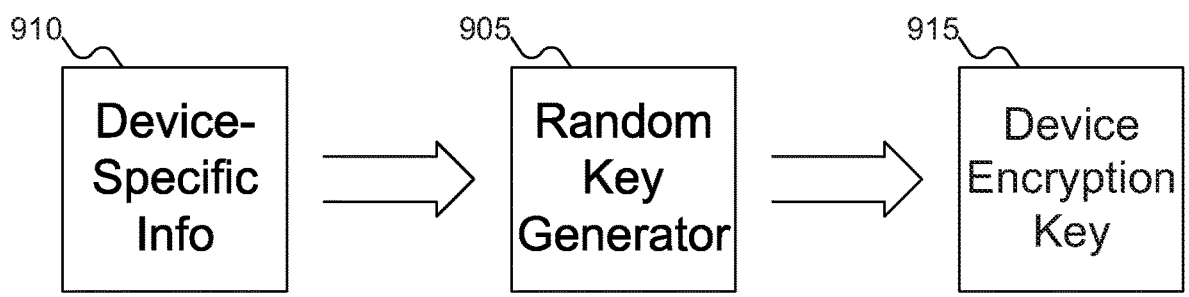
FIG. 8 shows details of the dedup map of FIG. 5.
FIG. 9 shows the operation of the random key generator of FIG. 5.

FIG. 8 shows details of dedup map 530 of FIG. 5. In FIG. 8, dedup map 530 is shown as a table including various entries. For example, one entry in dedup map 530 pairs hash value 605 with address 805 and count 810. Not all columns shown in dedup map 530 are needed, and other columns may also be stored in dedup map 530 as desired. Thus, given a particular hash value, address 805 may be used to locate where the actual data (encrypted using object encryption key 705 of FIG. 7) is stored, along with a count (count 810) of how many different objects actually point to this same address (which indicates how many duplicates of this object have not been stored. For searching purposes, dedup map 530 may include one or more index columns. While FIG. 7 shows dedup map 530 as a table, embodiments of the inventive concept may store the mapping between hash value 605 and address 805 and count 810 using any other desired data structures.

FIG. 8 shows dedup map 530 as including count 810, whereas FIG. 7 shows secure key share table 535 as including share list 710 and access list 715. As discussed above, various data may be stored in different data structures in different embodiments of the inventive concept. Thus, count 810 could be stored in secure key share table 535 of FIG. 7, or share list 710 of FIG. 7 and/or access list 715 of FIG. 7 could be stored in dedup map, depending on the embodiment of the inventive concept.

Note further that count 810 is not necessarily repetitive of access list 715 of FIG. 7. Access list 715 of FIG. 7 may identify which users are actively sharing the object, but not how many times they are sharing the object. If the same user has stored multiple copies of the same object (resulting in multiple data deduplications), access list 715 of FIG. 7 may only reflect the user ID once yet count 810 may reflect each such copy. Thus, count 810 should be at least as the number of entries in access list 715 of FIG. 7, but could be larger.

Note further that dedup map 530 does not necessarily need hash value 605. For example, secure key share table 535 of FIG. 7 could include a pointer, index, or some other reference to the appropriate entry in dedup map 530. This may further enhance security, since then dedup map 530 includes no information relating to what data is stored: dedup map 530 is little more than a list of addresses where data might be stored and how many different objects refer to that address.

FIG. 9 shows the operation of the random key generator of FIG. 5. In FIG. 9, random key generator 905 may take data 910—preferably data that is specific to the device, such as its serial number, although other variable information, such as the system date/time or a random number may be added as well—and use that data to generate device encryption key 915. Random key generator 905 may operate using any desired key generation scheme desired: the only condition is that the device encryption key should be secure. Put another way, it is desirable that a third party should not be able to regenerate or guess what device encryption key 915 is.

Figure 10:
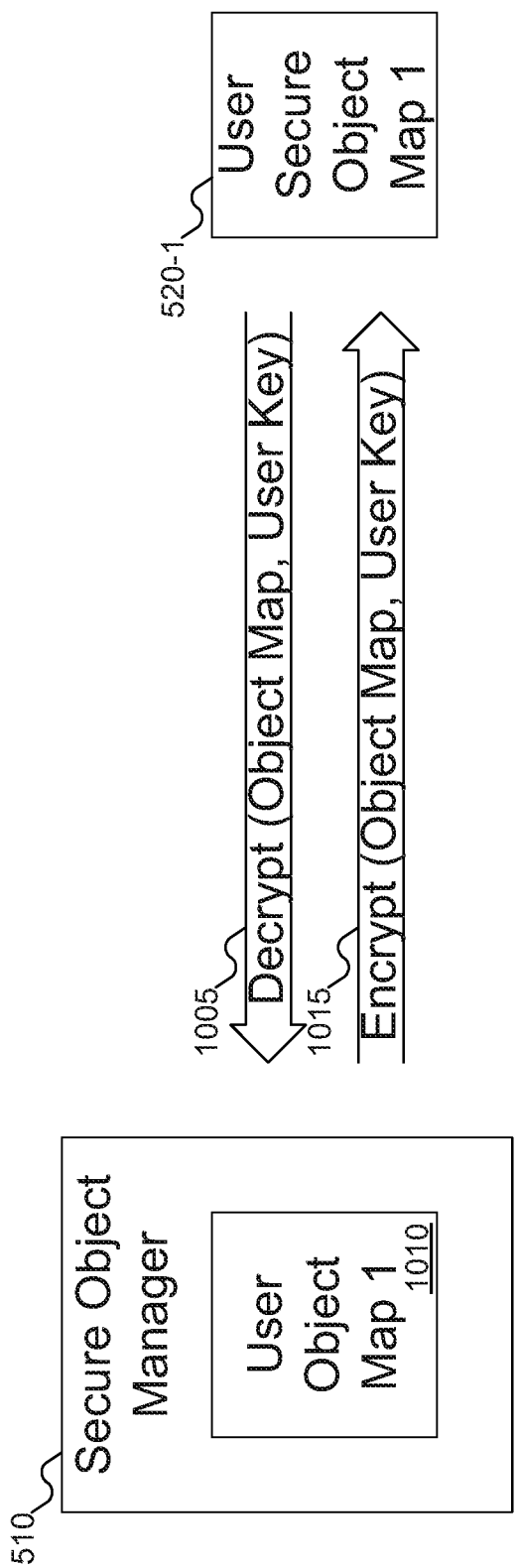
FIG. 10 shows the secure object manager of FIG. 5 retrieving a user secure object map from storage on the KV-SSD of FIG. 1.

FIG. 10 shows secure object manager 510 of FIG. 5 retrieving a user secure object map from storage on KV-SSD 120 of FIG. 1. In FIG. 10, secure object manager 510 may load a copy of user secure object map 520-1 from storage. As discussed above, this storage may be the same storage where objects are written (that is, flash memory chips 315-1 through 315-8 of FIG. 3), or this storage may be separate from where objects are written. To load the copy of user secure object map 520-1, user secure object map 520-1 may be decrypted using the user key, as shown in operation 1005. Secure object manager 510 may load user secure object map 520-1 either when the user logs into computer system 105 of FIG. 1 (and computer system 105 of FIG. 1 first provides the user key to KV-SSD 120 of FIG. 1), or when the user first attempts to access (either by writing, reading, or deleting) any object stored on KV-SSD 120 of FIG. 1. This decrypted version of user secure object map 520-1 is shown as user object map 1010.

During the course of using computer system 105 of FIG. 1, the user may modify the data in user secure object map 520-1 by writing or deleting objects (reading alone might not change information in user secure object map 520-1). When the user logs out of computer 105 of FIG. 1, user object map 1010 may be encrypted using the user key, as shown in operation 1015 and then written back into storage. Once user secure object map 520-1 is encrypted and written back to storage, user object map 1010 and the user key may be purged from KV-SSD 120 of FIG. 1 (that is, the decrypted form user object map 1010 may be purged, so that any information stored therein is protected: encrypted form user secure object map 520-1 would still be on KV-SSD 120 of FIG. 1).

Figure 11:
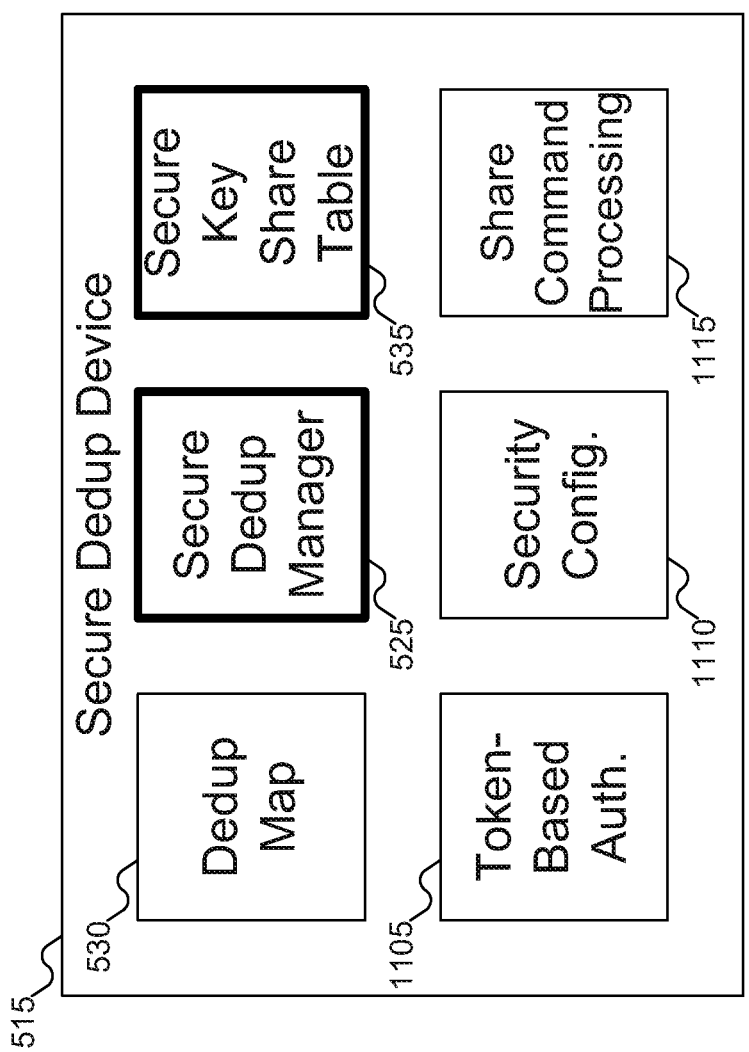
FIG. 11 shows details of the secure dedup device of FIG. 5 in another embodiment of the inventive concept.

FIG. 11 shows details of secure dedup device 515 of FIG. 5 in another embodiment of the inventive concept. In FIG. 11, secure dedup device 515 includes dedup map 530, secure dedup manager 525, and secure key share table 535. But secure dedup device 515 may also include token based authentication module 1105, security configuration 1110, and share command processing module 1115. These components may operate as in conventional token-based systems, but by placing these components in secure dedup device 515 secure dedup device 515 may leverage the power of these components in security operations (for example, encryption and/or decryption).

Whenever a device is opened or closed, a new token may be issued. Secure dedup device 515 may then share a pass with all active users. Any commands to secure dedup device 515 must have a valid pass: any commands without a valid pass may be rejected. Secure dedup device 515 may issue a new private key for each active user using an identifier Attribute-Based Encryption ABE). To share data between users, if a given data exists for the user, a cipher identifier may be returned; otherwise, the value may be written and a cipher identifier returned. A given cipher identifier may also be unshared between users.

Figure 12:
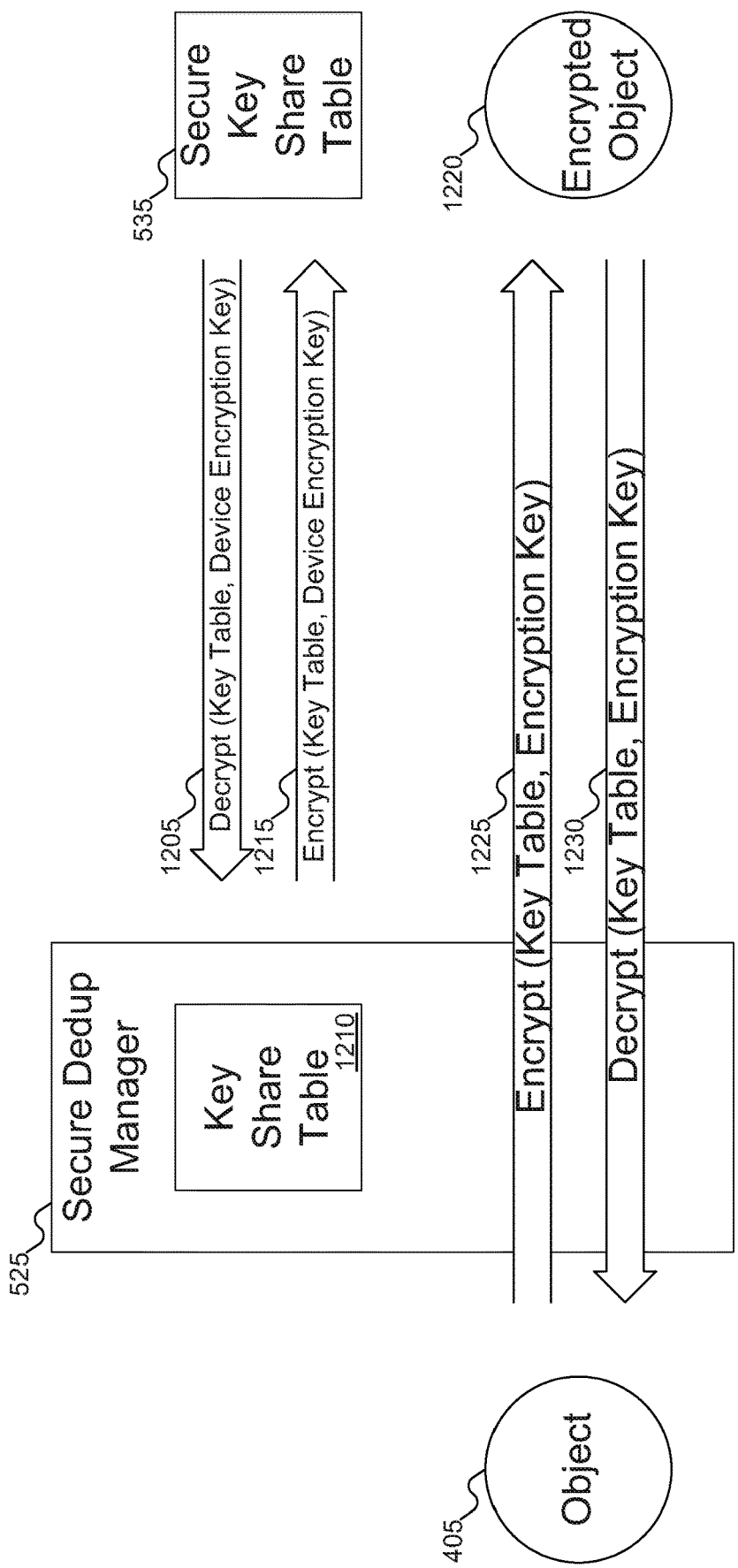
FIG. 12 shows the secure dedup manager of FIG. 5 retrieving a secure key share table and an encrypted object from storage on the KV-SSD of FIG. 1.

FIG. 12 shows secure dedup manager 525 of FIG. 5 retrieving a secure key share table and an encrypted object from storage on KV-SSD 120 of FIG. 1. Much like secure object manager 510 of FIG. 10, secure dedup manager 525 may retrieve secure key share table 535 from storage (which, again may be the same storage where objects are written (that is, flash memory chips 315-1 through 315-8 of FIG. 3), or separate from where objects are written). But instead of being encrypted by a user key, secure key share table 535 may be encrypted using device key 915 of FIG. 9 (as secure key share table may be used when any user attempts to access objects from KV-SSD 120 of FIG. 1). Thus, operation 1205 may decrypt secure key share table 535 using device encryption key 915 of FIG. 9 (shown decrypted in FIG. 11 as key share table 1210).

Once used, key share table 1210 may be encrypted again using device encryption key 915 of FIG. 9 to reestablish secure key share table 535, shown as operation 1215. The (encrypted) secure key share table 535 may then be written back to storage.

FIG. 12 shows an embodiment where only secure key share table 535 is decrypted: dedup map 530 of FIG. 5 is presumably not encrypted in the embodiment shown in FIG. 12. If dedup map 530 of FIG. 5 is encrypted, secure dedup manager 525 may decrypt and re-encrypt dedup map 530 of FIG. 5 in the same manner as secure key share table 535.

While there are many similarities between the operations of secure dedup manager 525 and secure object manager 510 of FIG. 10, there is at least one important difference between the two: the timing of encryption and decryption. It makes sense for secure object manager 510 of FIG. 10 to decrypt user secure object map 520-1 of FIG. 10 when the user logs in, and to re-encrypt user secure object map 520-1 of FIG. 10 when the user logs out: any data that might be compromised is limited to just those users who are active at the time of the compromise (and even then, the only exposed data might be the object keys and their associated hash values: even together such information is not enough for an attacker to access objects from KV-SSD 120 of FIG. 1). But as secure key share table 535 (and dedup map 530 of FIG. 5, if encrypted) are used in virtually every transaction on KV-SSD 120, waiting until all transactions are complete before encrypting the data structures to write them to storage would mean that the data structures would likely never be encrypted. Leaving these data structures (depending on what data they store) unencrypted is a potentially much bigger security vulnerability than leaving user secure object map 520-1 of FIG. 10 unencrypted for a while. Thus, in some embodiments of the inventive concept, secure key share table 535 (and dedup map 530 of FIG. 5, if encrypted) may be decrypted when necessary to perform a transaction, and may be re-encrypted once that transaction is complete. Such an arrangement ensures that the data structures are in a decrypted state for the minimum amount of time, which may reduce the risk of data vulnerability.

Another alternative is for entries to be encrypted separately rather than the entirety of secure key share table 535. That is, hash value 605 of FIG. 7 might be left unencrypted (so that the appropriate entry in secure key share table 535 may be identified), but share list 710 of FIG. 7, access list 715 of FIG. 7, and object encryption key 705 of FIG. 7 may be (separately) encrypted. (Since hash value 605 does not normally provide any useful information, leaving hash value 605 of FIG. 7 unencrypted does not introduce a vulnerability.) In this manner, the appropriate data needed for a particular transaction (but only that data) may be decrypted, with the remaining data encrypted and secure.

Something in between would be to divide secure key share table 535 into portions—for example, amounts that would fit into an individual page in KV-SSD 120 of FIG. 1—and encrypt each such portion separately. In such embodiments of the inventive concept, only the appropriate portion of secure key share table 535 need be decrypted when needed, rather than the entirety of secure key share table 535. (Of course, each such portion could be considered a separate secure key share table, in which case secure dedup manager 525 of FIG. 5 is effectively decrypting an entire secure key share table, just not every secure key share table.)

It is also worth noting that since read request might not change any information in secure key share table 535, encrypting secure key share table 535 after a read transaction might not be needed. Thus, in some embodiments of the inventive concept, key share table 1210 may simply be purged after a read transaction without loss of information.

Once object encryption key 705 of FIG. 7 used to encrypt a particular object has been determined from secure key share table 535, that encryption key may be used to encrypt and/or decrypt data value 415 of FIG. 4 for the object. Thus, for example, if data is being written to KV-SSD 120 of FIG. 1, then object encryption key 705 of FIG. 7 may be used to encrypt data value 415 of FIG. 4 for object 405 and producing encrypted object 1220, shown as operation 1225. On the other hand, if data is being read from KV-SSD 120 of FIG. 1, then object encryption key 705 of FIG. 7 may be used to decrypt encrypted object 1220 to produce object 405, shown as operation 1230.

One question that might arise is how object encryption key 705 of FIG. 7 is initially determined when object 405 is first written to KV-SSD 120 of FIG. 1. The answer is that object encryption key 705 of FIG. 7 may be determined according to any desired policy. One policy might specify that device encryption key 915 of FIG. 1 is to be used as object encryption key 705 of FIG. 7. Another policy might specify that the user key is to be used as object encryption key 705 of FIG. 7 for all objects written by a user. A third policy might specify that a unique object encryption key 705 of FIG. 7 is to be generated (perhaps based on data value 405 of FIG. 4 of the object being written) for each object. A fourth policy might prompt the user to select object encryption key 705 of FIG. 7 to be used when object 405 is first written to KV-SSD 120 of FIG. 1. Other policies may be used as well, whether or not explicitly described herein.

At this point, it is worth revisiting the subject of encryption keys. Three different encryption keys have been discussed to date: the user key (used to encrypt/decrypt user secure object map 520-1 of FIG. 10), device encryption key 915 of FIG. 9 (used to encrypt/decrypt secure key share table 535 of FIG. 12), and object encryption key 705 of FIG. 7. There are some points worth nothing about these keys. Various points have been discussed about these encryption keys in the above discussion, but there are additional points to note.

First, there are two different types of cryptographic systems in common use today: the private-key cryptosystem (also called a symmetric cryptosystem), where the same encryption key is used to encrypt and decrypt data, and the public-key cryptosystem (also called an asymmetric cryptosystem), where different keys are used to encrypt and decrypt data. Any reference to an "encryption key" of any sort may include keys using either type of cryptosystem. Further, if the cryptosystem is a public-key cryptosystem, then any reference to "encryption key" is intended to also include the corresponding decryption key, so that both operations may be performed. For example, operations 1005 and 1015 of FIG. 10 both refer to the user key in encrypting and decrypting user secure object map 520-1 of FIG. 10, just as operations 1205 and 1215 both refer to device encryption key 915 of FIG. 1, and operations 1225 and 1230 both refer to object encryption key 705 of FIG. 7. Since public-key cryptosystems use different keys to encrypt and decrypt data, it should be obvious that the same encryption key cannot be used for both operations. Thus, the reference to the encryption key in operations 1005 of FIG. 10, operation 1205, and operation 1230 would use the corresponding decryption key, not the recited encryption key. This understanding is intended by the use of the term encryption key: whatever key is needed, depending on the chosen cryptosystem, may be used where the term "encryption key" (or its variants) is used.

Second, embodiments of the inventive concept are not limited to a single cryptosystem, or even to a single type of cryptosystem. There are many different cryptosystems available, such as the Data Encryption Standard (DES) (a private-key cryptosystem), the Advanced Encryption Standard (AES) (a private-key cryptosystem), Rivest-Shamir-Adleman (RSA) (a public-key cryptosystem), and elliptic curve techniques (a public-key cryptosystem). One encryption key might use DES, another might use AES, a third might use RSA, and a fourth might use an elliptic curve technique. Embodiments of the inventive concept support the use of any combination of different cryptosystems of any desired types. Thus, to facilitate implementation, the term "encryption key" may also be understood to identify the specific cryptosystem for which that encryption key is to be used, and such information may be stored where appropriate (for example, the appropriate cryptosystem for a particular object encryption key 705 of FIG. 7 may be stored in the entry in secure key share table 535 of FIG. 7 associated with hash value 605 of FIG. 7). Thus, to be clear, secure dedup manager 525 may be using different cryptosystems (and even different cryptosystem types) in accessing secure key share table 535 and encrypted object 1220.

Returning now to FIG. 5, all the pieces of the puzzle are in place to understand how secure dedup 530 may operate. Consider a write request from a user. When the write request arrives, secure object manager 510 may use hash function 505 to generate hash value 605 of FIGS. 6-8 from data value 415 of FIG. 4. Secure object manager 510 may then check to see if the appropriate user secure object map for that user includes an entry with object key 410 of FIG. 4. If so, the entry may be updated with the new hash value 605 of FIG. 6; if not, a new entry may be created in the user's secure object map, mapping object key 410 of FIG. 6 to hash value 605 of FIG. 6. Either way, secure object manager 510 may then pass hash value 605 of FIGS. 6-8 and data value 410 of FIG. 4 to secure dedup manager 525.

Secure dedup manager 525 may then decrypt secure key share table 535 and see if there is an entry in secure key share table 535 for hash value 605 of FIG. 7. If there is no entry in secure key share table 535 for hash value 605 of FIG. 7 at all, or if there is an entry in secure key share table 535 for hash value 605 of FIG. 7 but the user is not in share list 710 of FIG. 7 (in which case the user should be denied access to the existing object), then a new entry may be created in secure hash table 535 for hash value 605 of FIG. 7. An appropriate encryption key may be selected and stored as object encryption key 705 of FIG. 7 in the new entry in secure key share table 535. Data value 415 of FIG. 4 may be encrypted using object encryption key 705 of FIG. 7 and written to an address on KV-SSD 120 of FIG. 1. A new entry may be added to dedup map 530, storing hash value 605 of FIG. 8 and mapping hash value 605 of FIG. 8 to address 805 of FIG. 8. Finally, reference count 810 of FIG. 8 may be set to one, to indicate that currently only one object refers to the value stored at address 805 of FIG. 8.

On the other hand, if an entry exists in secure key share table 535 for hash value 605 of FIG. 7 and the user is in share list 710 of FIG. 7, then the user may be added to access list 715 of FIG. 7, and reference count 810 of FIG. 8 may be incremented (to reflect that a new object has been deduplicated by just referencing an existing object).

Another point worth considering is how overwriting of data values where data deduplication has occurred may be handled. There are two alternative approaches. One approach follows from the principle that each user may assume that they are manipulating a private object, separate from what any other user might be doing. In this approach, when a user attempts to overwrite data value 415 of FIG. 4 with a new data value, if hash value 605 of FIG. 7 of data value 415 of FIG. 4 is shared (as may be found by examining secure key share table 535 of FIG. 5 or dedup map 530 of FIG. 5), then rather than replacing data value 415 of FIG. 4 with the new data value, KV-SSD 120 of FIG. 1 may choose to store a new object with the new data value (and remove the user from access list 715 of FIG. 7 of the old object, decrementing reference count 815 of FIG. 8 accordingly as well). The other approach follows from the principle that the users are aware that they are sharing access to the same object, and therefore would not be surprise if someone else overwrites data value 415 of FIG. 4 with a new data value. Which approach is used may be decided by policy and may depend on the particular implementation of KV-SSD 120 of FIG. 1: it may even be possible for different users to specify their policy preferences, allowing for a mixed approach.

If a user who does not have access to a particular object key attempts to write an object with that same key, a problem may result. After all, KV-SSD 120 of FIG. 1 may not permit multiple objects to be stored using the same object key. This problem may occur, for example, by chance (the user just happens to attempt to write an object using an existing object key, without knowing it), or when the user attempts to update a shared object, resulting in the storage of a new object (according to one of the policies discussed above). This is one of the reasons why hash value 605 of FIGS. 6-8 is used rather than object key 410 of FIG. 4 as the identifier of the data value of interest. But it is also possible for hash values to collide: if, for example, the same data is written by two different users who are not sharing access to an object. To help resolve such collisions, additional columns may be added to user secure object maps 520-1, 520-2, and 520-3 of FIG. 5, secure key share table 535 of FIG. 5, and dedup map 530 of FIG. 5: for example, an identifier of the user who initially wrote the object may be added. Then, the combination of the hash value and the identifier of the user who initially wrote the object may be used as the source for mappings to other data in secure key share table 535 of FIG. 5 and dedup map 530 of FIG. 5, which should avoid any further collisions based on hash value 605 of FIGS. 7-8.

Yet another point that has not been discussed yet is whether hash value 605 of FIGS. 6-8 is updated when a user overwrites data value 415 of FIG. 4 with a new data value. On the one hand, hash value 605 of FIGS. 6-8 essentially identifies the object. That there may be a disconnect between the current data value of the object and hash value 605 of FIGS. 6-8 may not be particularly pertinent. On the other hand, by using the name hash value, an implicit assumption exists that hash value 605 of FIGS. 6-8 represents the application of hash function 505 to the current data value stored on KV-SSD 120 of FIG. 1. If the data value changes, then hash value 605 of FIGS. 6-8 ought to change as well. Either approach may be used as desired (although it is noted that changing hash value 605 of FIGS. 6-8 could have implications for the identification of object encryption key 705 of FIG. 7 when message-locked encryption is used).

Consider now a read request from a user. When secure object map 510 receives the read request, secure object map 510 may access the appropriate user secure object map for that user and check to see if an entry exists with object key 410 of FIG. 4. If no entry exists, then the user has requested access to an object that (as far as the user is concerned) does not exist, so secure object manager 510 may return an error.

On the other hand, if the user's secure object map does include an entry for object key 410 of FIG. 6, secure object manager 510 may map object key 410 of FIG. 6 to hash value 605 of FIG. 6, and may pass hash value 605 of FIG. 6 to secure dedup manager 525. Secure dedup manager 525 may then access secure key share table 535 to see if an entry exists for hash value 605 of FIG. 7. Note that this test should always succeed, since the user's secure object map indicates an object exists for object key 410 of FIG. 6. If this test fails, an unusual error has occurred. Secure dedup manager 525 may also check to see if the user is included in share list 710 of FIG. 7 (and possibly access list 715 of FIG. 7). Again, this test should always succeed, since the user's secure object map indicates the user has access to the object: if this test fails, an unusual error has occurred. Now, assuming that the secure key share table 535 has confirmed that the user has access to the object, secure dedup manager 525 may map hash value 605 of FIG. 8 to address 805 of FIG. 8, read the value from address 805 of FIG. 8, decrypt the data using object encryption key 705 of FIG. 7, and return the data to the user.

Finally, consider a delete request. When secure object map 510 receives the delete request, secure object map 510 may access the appropriate user secure object map for that user and check to see if an entry exists with object key 410 of FIG. 4. If no entry exists, then the user has requested access to an object that (as far as the user is concerned) does not exist, so secure object manager 510 may return an error.

On the other hand, if the user's secure object map does include an entry for object key 410 of FIG. 6, secure object manager 510 may map object key 410 of FIG. 6 to hash value 605 of FIG. 6, and may pass hash value 605 of FIG. 6 to secure dedup manager 525. Secure object manager 510 may then delete the entry in the user's secure object map. Secure dedup manager 525 may then access secure key share table 535 to see if an entry exists for hash value 605 of FIG. 7. Note that this test should always succeed, since the user's secure object map indicates an object exists for object key 410 of FIG. 6. If this test fails, an unusual error has occurred. Secure dedup manager 525 may also check to see if the user is included in share list 710 of FIG. 7 (and possibly access list 715 of FIG. 7). Again, this test should always succeed, since the user's secure object map indicates the user has access to the object: if this test fails, an unusual error has occurred. Now, assuming that the secure key share table 535 has confirmed that the user has access to the object, secure dedup manager 525 may map hash value 605 of FIG. 8 to reference count 810 of FIG. 8, and decrement reference count 810 of FIG. 8. If reference count 810 of FIG. 8 is now zero, secure dedup manager 525 may also invalidate the data stored at address 805 of FIG. 8 and may remove the entries that map from hash value 605 of FIGS. 7-8 to other data in secure key share table 535 and dedup map 530. Secure dedup manager 525 may then send a response to the user indicating that the object was successfully deleted.

All of the above discussion has centered around one basic principle: before a user may read data (or delete data) from KV-SSD 120 of FIG. 1, the must first have written the data to KV-SSD 120 of FIG. 1. That data may be shared between users does not change this principle: even if modern operating systems a user must typically create at least a link (either symbolic or hard) to the original file before they may do anything with the data.

But what if the mere act of sharing the file from one user to another were enough to permit the second user to access the file? After all, in KV-SSD 120 of FIG. 1, all that is needed to access the object is object key 410 of FIG. 4, which anyone might have. Thus, even though a user might not yet have written a copy of the object to KV-SSD 120 of FIG. 1, by knowing object key 410 of FIG. 4 and by being on share list 710 of FIG. 7, the user ought to be able to access the object without writing the object first: that is, the user could read and/or delete the object.

In such embodiments of the inventive concept, there are some changes relative to the previously described embodiments of the inventive concept. First, an entry in user secure object maps 520-1, 520-2, and/or 520-3 of FIG. 5 would not necessarily be enough to determine if the user should be permitted to read or delete the object. After all, if an entry is placed in user secure object maps 520-1, 520-2, and/or 520-3 of FIG. 5 only when the user writes the object to KV-SSD 120 of FIG. 1, then a lack of an entry in user secure object maps 520-1, 520-2, and/or 520-3 of FIG. 5 would only mean that the user has not written the object to KV-SSD 120 of FIG. 1, but not that they have no right to access the object. There are two apparent solutions. One is to establish a rule that the act of sharing an object with another user automatically adds an entry to that user's user secure object table for that object. The other is to eliminate user secure object maps 520-1, 520-2, and/or 520-3 of FIG. 5 (or at least individual user secure object maps 520-1, 520-2, and/or 520-3 of FIG. 5, and instead just have a global map from object keys to hash values), and instead map object keys to hash values within secure key share table 535 of FIG. 7. Then, determining whether the user has access to the object may be determined simply by locating the entry in secure key share table 535 of FIG. 7, identifying share list 710 of FIG. 7, and verifying that the user's identifier is in share list 710 of FIG. 7. If the user has permission to access the object, operations may proceed otherwise unchanged; if the user does not have permission to access the object, an error may be returned.

Figure 13:
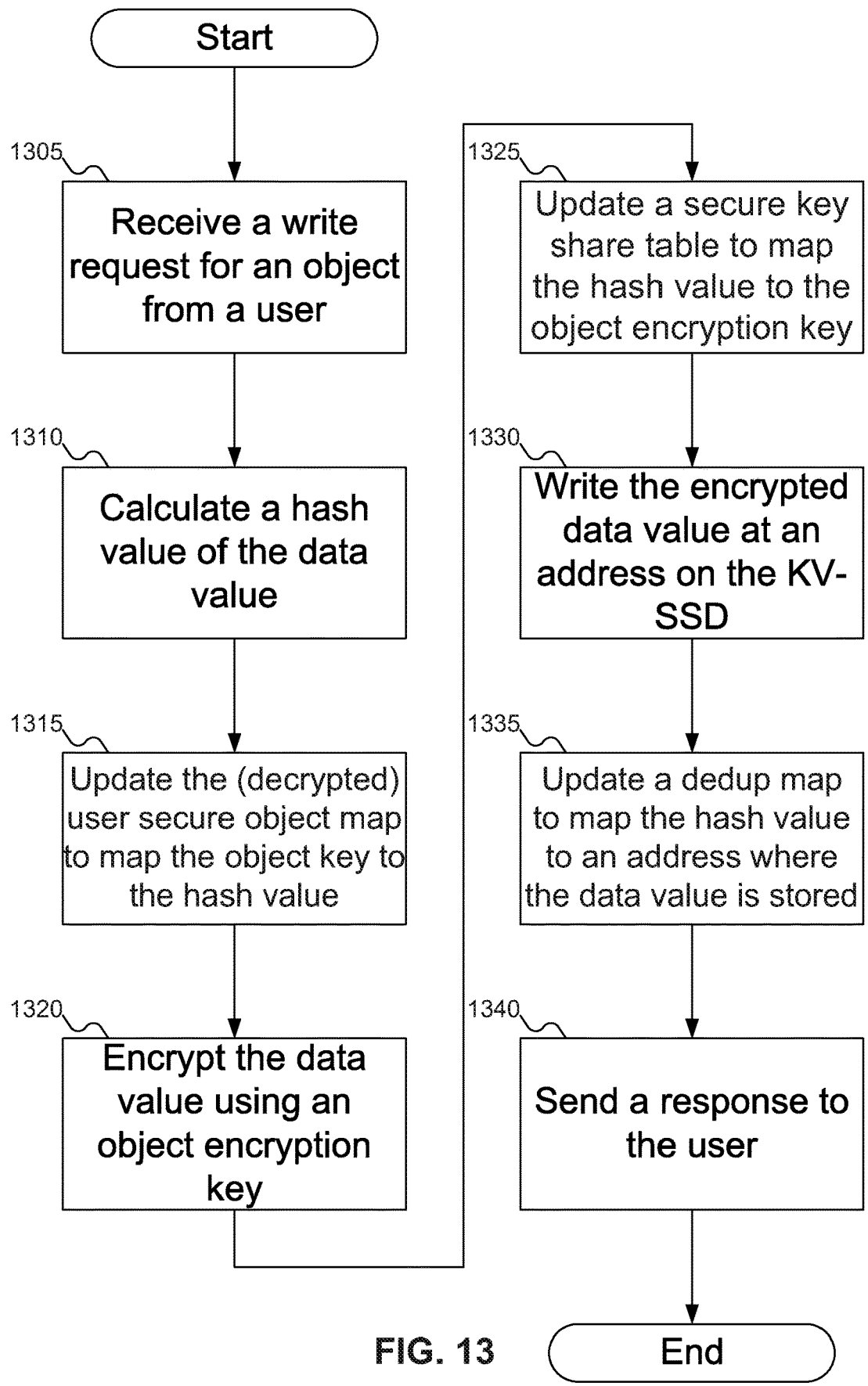
FIG. 13 shows a flowchart of an example procedure for the KV-SSD of FIG. 1 to process a write request from a user, according to an embodiment of the inventive concept.

FIG. 13 shows a flowchart of an example procedure for KV-SSD 120 of FIG. 1 to process a write request from a user, according to an embodiment of the inventive concept. In FIG. 13, at block 1305, KV-SSD 120 of FIG. 1 may receive a write request from a user to write an object to KV-SSD 120 of FIG. 1. At block 1310, secure object manager 510 of FIG. 5 may use hash function 505 of FIG. 5 to calculate hash value 605 of FIGS. 6-8 from data value 415 of FIG. 4. At block 1315, secure object manager 510 of FIG. 5 may updated user secure object map 520-1, 520-2, or 520-3 of FIG. 5 for the user to map object key 410 of FIG. 6 to hash value 605 of FIG. 6. At block 1320, secure dedup manager 525 of FIG. 5 may encrypt data value 415 of FIG. 4 using object encryption key 705 of FIG. 7.

At block 1325, secure dedup manager 525 of FIG. 5 may update secure key share table 535 of FIG. 5 to map hash value 605 of FIG. 7 to object encryption key 705 of FIG. 7. At block 1330, secure dedup manager 525 of FIG. 5 may write the encrypted data value to address 805 of FIG. 8 on KV-SSD 120 of FIG. 1. At block 1335, secure dedup manager 525 of FIG. 5 may update dedup map 530 of FIG. 5 to map hash value 605 of FIG. 8 to address 805 of FIG. 8. Secure dedup manager 525 of FIG. 5 may also update dedup map 530 of FIG. 5 to increment reference count 810 of FIG. 8 to identify a new object referencing the data stored at address 805 of FIG. 8. (Note that in this context, here and elsewhere, "update" does not necessarily mean that any values are changed. For example, if the user is writing a copy of the object that already exists on KV-SSD 120 of FIG. 1 and reference count 810 of FIG. 8 is actually stored in secure key share table 535 of FIG. 5, then dedup map 530 of FIG. 5 might not actually be changed.) Finally, at block 1340, secure dedup 325 of FIG. 5 may send a response to the user that object 405 of FIG. 4 was successfully written to KV-SSD 120 of FIG. 1.

Figure 14:
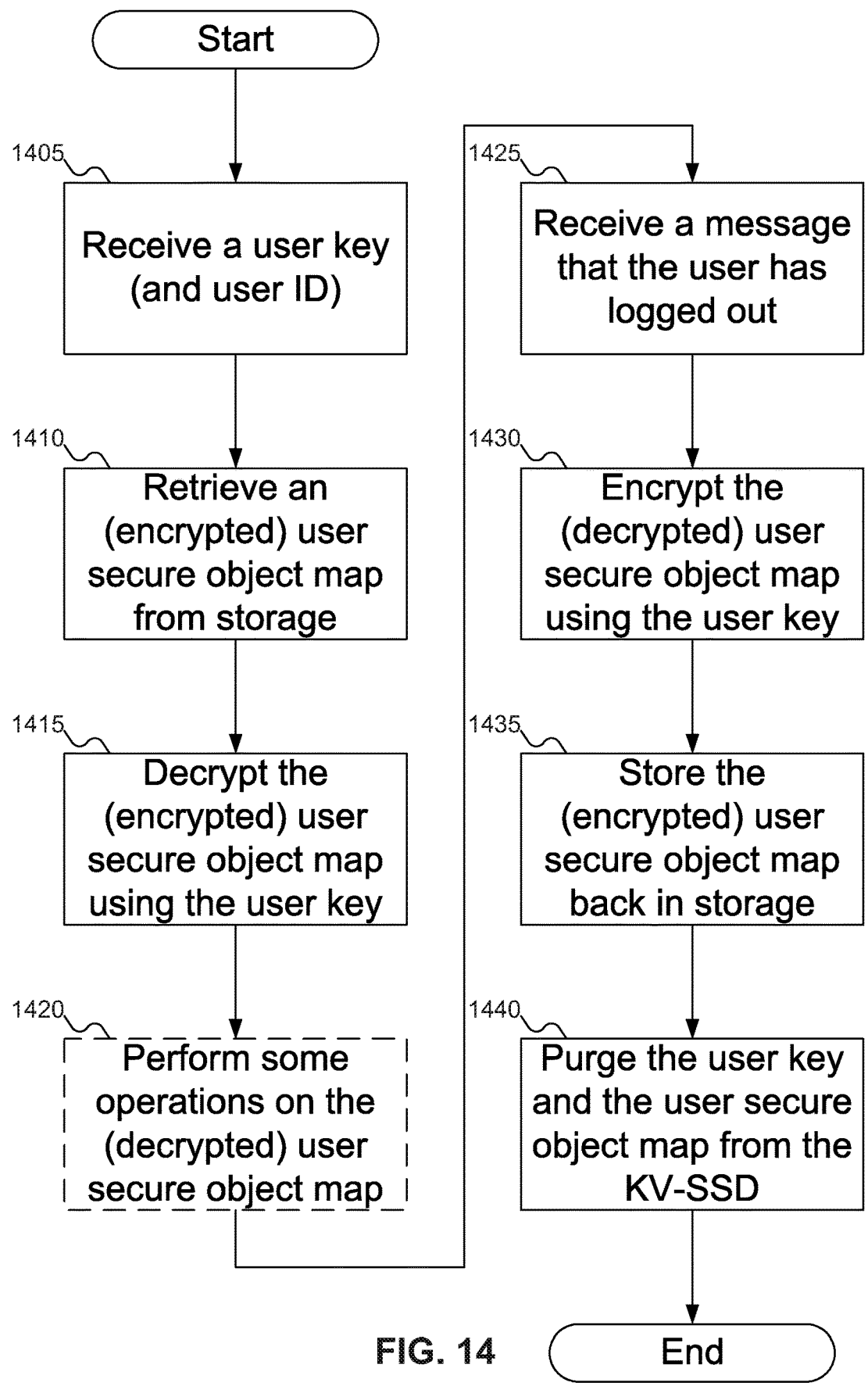
FIG. 14 shows a flowchart of an example procedure for the secure object manager of FIG. 5 to use the user secure object map of FIG. 5.

FIG. 14 shows a flowchart of an example procedure for secure object manager 510 of FIG. 5 to use user secure object maps 520-1, 520-2, and 520-3 of FIG. 5. In FIG. 14, at block 1405, secure object manager 510 of FIG. 5 may receive a user key (and possibly a user identifier). Block 1405 may occur when, for example, a user first logs into a device that attempts to access KV-SSD 120 of FIG. 1. At block 1410, secure object manager 510 of FIG. 5 may retrieve an encrypted user secure object map 520-1, 520-2, or 520-3 of FIG. 5 from storage. At block 1415, secure object manager 510 of FIG. 5 may decrypt user secure object map 520-1, 520-2, or 520-3 of FIG. 5 using the user key.

At block 1420, secure object manager 510 of FIG. 5 may perform operations on user secure object map 520-1, 520-2, or 520-3 of FIG. 5. Examples of such operations may include updating user secure object map 520-1, 520-2, or 520-3 of FIG. 5 to map object key 410 of FIG. 6 to hash value 605 of FIG. 6, as shown in block 1315 of FIG. 13: other examples (discussed below) may include receiving object key 410 of FIG. 4 and using user secure object map 520-1, 520-2, or 520-3 of FIG. 5 to map object key 410 of FIG. 6 to hash value 605 of FIG. 6 (as may occur when reading object 405 of FIG. 4 from KV-SSD 120 of FIG. 1), or deleting the mapping from object key 410 of FIG. 6 to hash value 605 of FIG. 6 (as may occur when deleting object 405 of FIG. 4 from KV-SSD 120 of FIG. 1).

Eventually, KV-SSD 120 of FIG. 1 may receive a message that the user has logged out of the device, as shown at block 1425. At block 1430, secure object manager 510 of FIG. 5 may encrypt user secure object map 520-1, 520-2, or 520-3 of FIG. 5, and at block 1435 secure object manager 510 of FIG. 5 may write the encrypted user secure object map 520-1, 520-2, or 520-3 of FIG. 5 back to storage. Finally, at block 1440, secure object manager 510 of FIG. 5 may purge user secure object map 520-1, 520-2, or 520-3 of FIG. 5 and the user key from KV-SSD 120 of FIG. 1, so that no-one who tampers with KV-SSD 120 of FIG. 1 may be able to decrypt user secure object map 520-1, 520-2, or 520-3 of FIG. 5.

Figure 15:
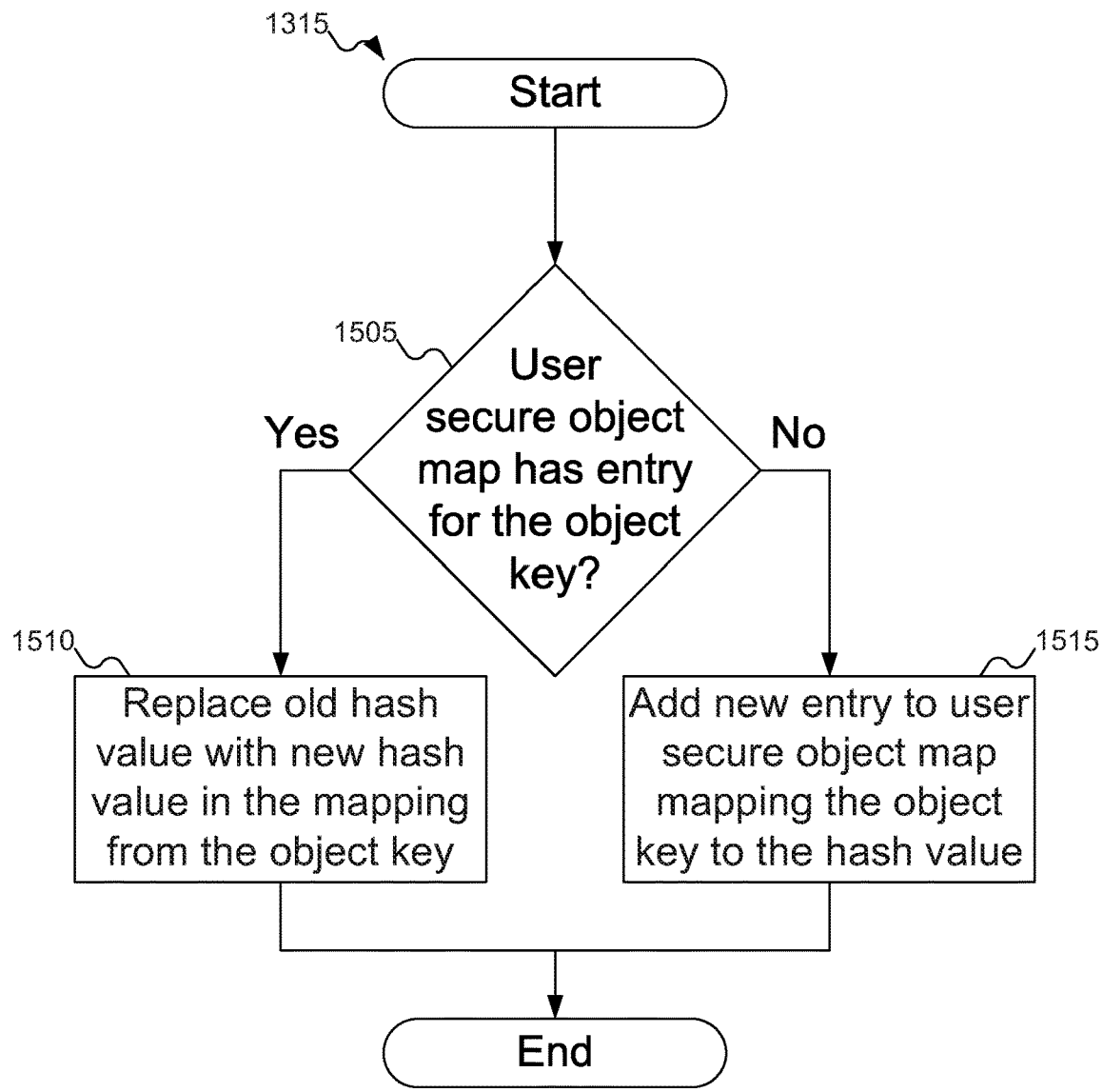
FIG. 15 shows a flowchart of an example procedure for the secure object manager of FIG. 5 to update a user secure object map.

FIG. 15 shows a flowchart of an example procedure for secure object manager 510 of FIG. 5 to update user secure object maps 520-1, 520-2, and 520-3. In FIG. 15, at block 1505, secure object manager 510 of FIG. 5 may determine whether an entry exists in user secure object map 520-1, 520-2, or 520-3 of FIG. 5 for object key 410 of FIG. 6. If an entry in user secure object map 520-1, 520-2, or 520-3 of FIG. 5 for object key 410 of FIG. 4 exists, then at block 1510, secure object manager 510 of FIG. 5 may update user secure object map 520-1, 520-2, or 520-3 of FIG. 5 by replacing the old hash value in that entry with the new hash value 605 of FIG. 6 (generated by hash function 505 of FIG. 5 hashing data value 415 of FIG. 4). Otherwise, at block 1515, secure object manager 510 of FIG. 5 may add a new entry to user secure object map 520-1, 520-2, or 520-3 of FIG. 5, mapping object key 410 of FIG. 4 to hash value 605 of FIG. 6 (again, generated by hash function 505 of FIG. 5 hashing data value 415 of FIG. 4).

Figure 16:
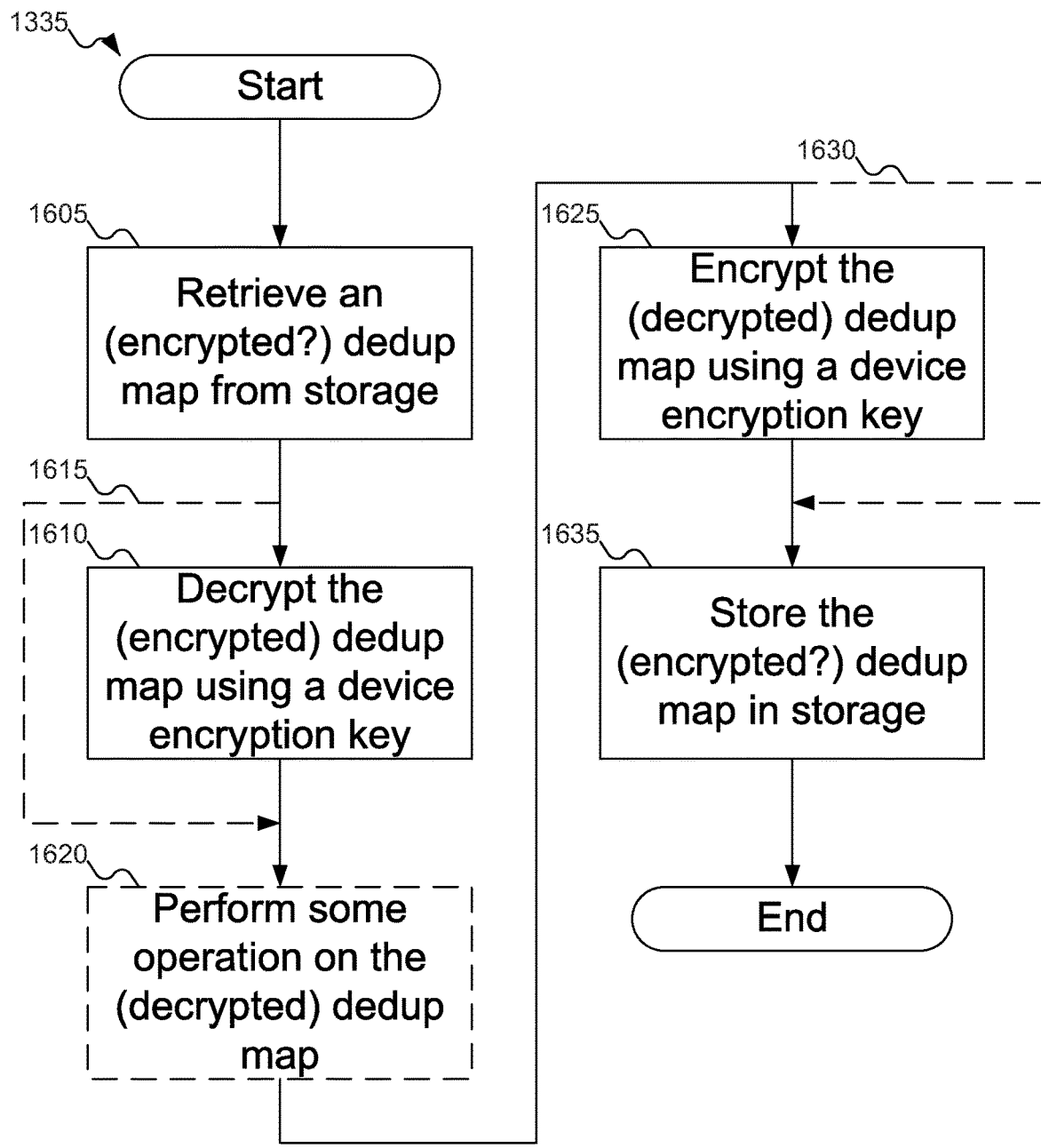
FIG. 16 shows a flowchart of an example procedure for the secure dedup manager of FIG. 5 to use the dedup map of FIG. 5.

FIG. 16 shows a flowchart of an example procedure for secure dedup manager 525 of FIG. 5 to use dedup map 530 of FIG. 5. In FIG. 16, at block 1605, secure dedup manager 525 of FIG. 5 may retrieve dedup map 530 of FIG. 5 from storage. Depending on the embodiment of the inventive concept, dedup map 530 of FIG. 5 may be stored encrypted or not. At block 1610, secure dedup manager 525 of FIG. 5 may decrypt an encrypted dedup map 530 of FIG. 5 using device encryption key 915 of FIG. 9. Block 1610 may be omitted if dedup map 530 of FIG. 5 is not encrypted, as shown by dashed line 1615.

At block 1620, secure dedup manager 525 of FIG. 5 may perform operations on dedup map 530 of FIG. 5. Examples of such operations may include updating dedup map 530 of FIG. 5 to map hash value 605 of FIG. 8 to address 805 of FIG. 8, as shown in block 1335 of FIG. 13: other examples (discussed below) may include receiving hash value 605 of FIG. 8 and determining address 805 of FIG. 8 as mapped from hash value 605 of FIG. 8 (as may occur when reading object 405 of FIG. 4 from KV-SSD 120 of FIG. 1), incrementing or decrementing reference count 810 of FIG. 8 (as may occur when object 405 of FIG. 4 is written to or deleted from KV-SSD 120 of FIG. 1), or deleting the mapping from hash value 605 of FIG. 8 to address 805 of FIG. 8 in dedup map 530 of FIG. 5 (as may occur when deleting object 405 of FIG. 4 from KV-SSD 120 of FIG. 1).

Once secure dedup manager 525 of FIG. 5 is finished using dedup map 530 of FIG. 5 for the current transaction, secure dedup manager 525 of FIG. 5 may encrypt dedup map 530 of FIG. 5 using device encryption key 915 of FIG. 9, as shown at block 1625. Again, if dedup map 530 of FIG. 5 is stored unencrypted, block 1625 may be omitted, as shown by dashed line 1630. Finally, at block 1635, secure dedup manager 525 of FIG. 5 may store dedup map 530 of FIG. 5 (either encrypted or unencrypted, depending on the embodiment of the inventive concept) to storage in KV-SSD 120 of FIG. 1.

Figure 17:
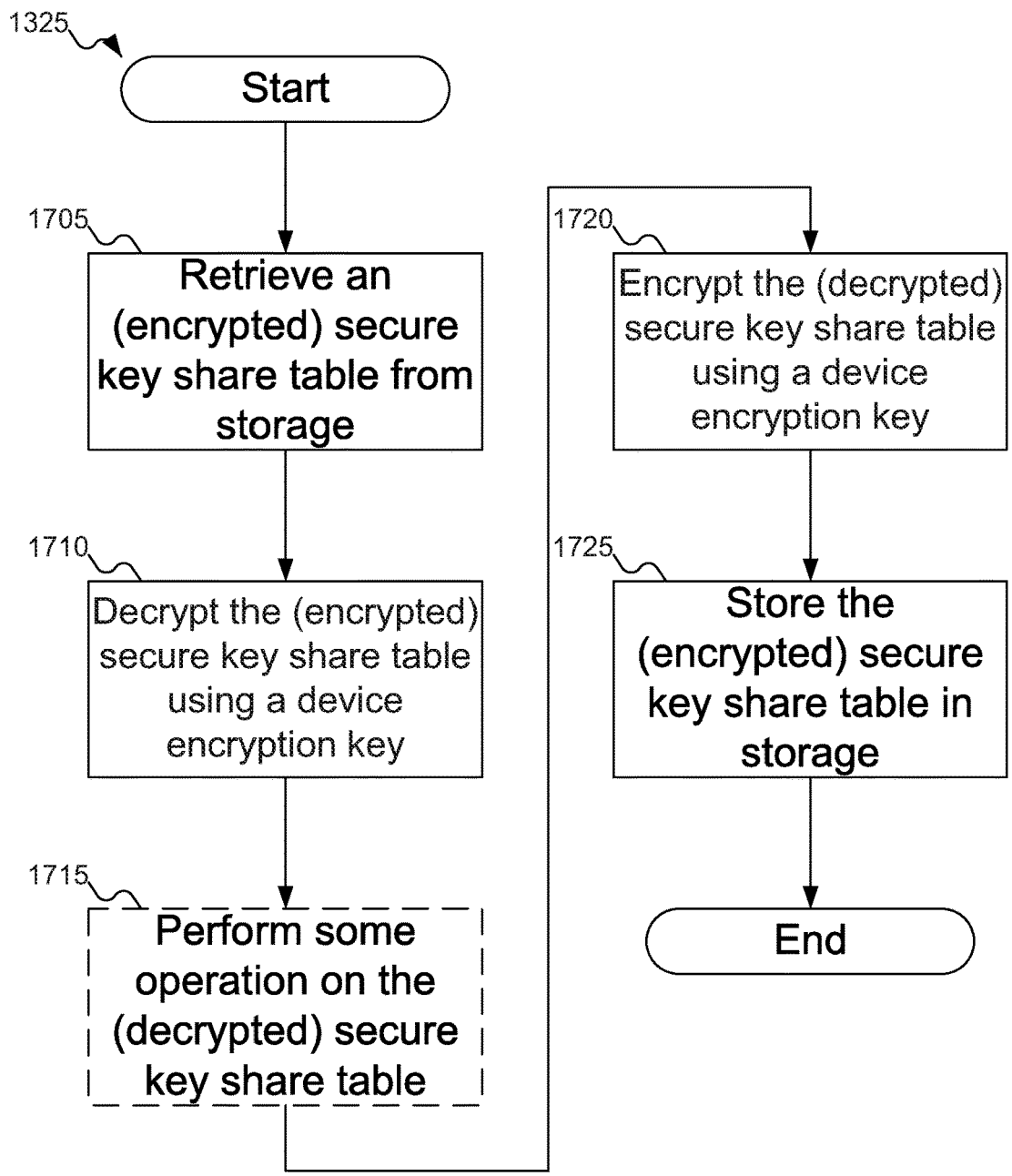
FIG. 17 shows a flowchart of an example procedure for the secure dedup manager of FIG. 5 to use the secure key share table of FIG. 5.

FIG. 17 shows a flowchart of an example procedure for secure dedup manager 525 of FIG. 5 to use secure key share table 535 of FIG. 5. In FIG. 17, at block 1705, secure dedup manager 525 of FIG. 5 may retrieve secure key share table 535 of FIG. 5 from storage. Unlike dedup map 530 of FIG. 5 as discussed above with reference to FIG. 16, secure key share table 535 of FIG. 5 should be stored encrypted. At block 1710, secure dedup manager 525 of FIG. 5 may decrypt an encrypted secure key share table 535 of FIG. 5 using device encryption key 915 of FIG. 9.

At block 1715, secure dedup manager 525 of FIG. 5 may perform operations on secure key share table 535 of FIG. 5. Examples of such operations may include updating secure key share table 535 of FIG. 5 to map hash value 605 of FIG. 7 to object encryption key 705 of FIG. 7, as shown in block 1325 of FIG. 13: other examples (discussed below) may include receiving hash value 605 of FIG. 7 and determining object encryption key 705 of FIG. 7 as mapped from hash value 605 of FIG. 7 (as may occur when reading object 405 of FIG. 4 from KV-SSD 120 of FIG. 1), adding or removing users from share list 710 of FIG. 7 and/or access list 715 of FIG. 7, as the share and access lists change (as may occur when object 405 of FIG. 4 is written to or deleted from KV-SSD 120 of FIG. 1), or deleting the mapping from hash value 605 of FIG. 7 to object encryption key 705 of FIG. 7 in secure key share table 535 of FIG. 5 (as may occur when deleting object 405 of FIG. 4 from KV-SSD 120 of FIG. 1).

Once secure dedup manager 525 of FIG. 5 is finished using secure key share table 535 of FIG. 5 for the current transaction, secure dedup manager 525 of FIG. 5 may encrypt secure key share table 535 of FIG. 5 using device encryption key 915 of FIG. 9, as shown at block 1720. Finally, at block 1725, secure dedup manager 525 of FIG. 5 may store encrypted secure key share table 535 of FIG. 5 to storage in KV-SSD 120 of FIG. 1.

Figure 18:
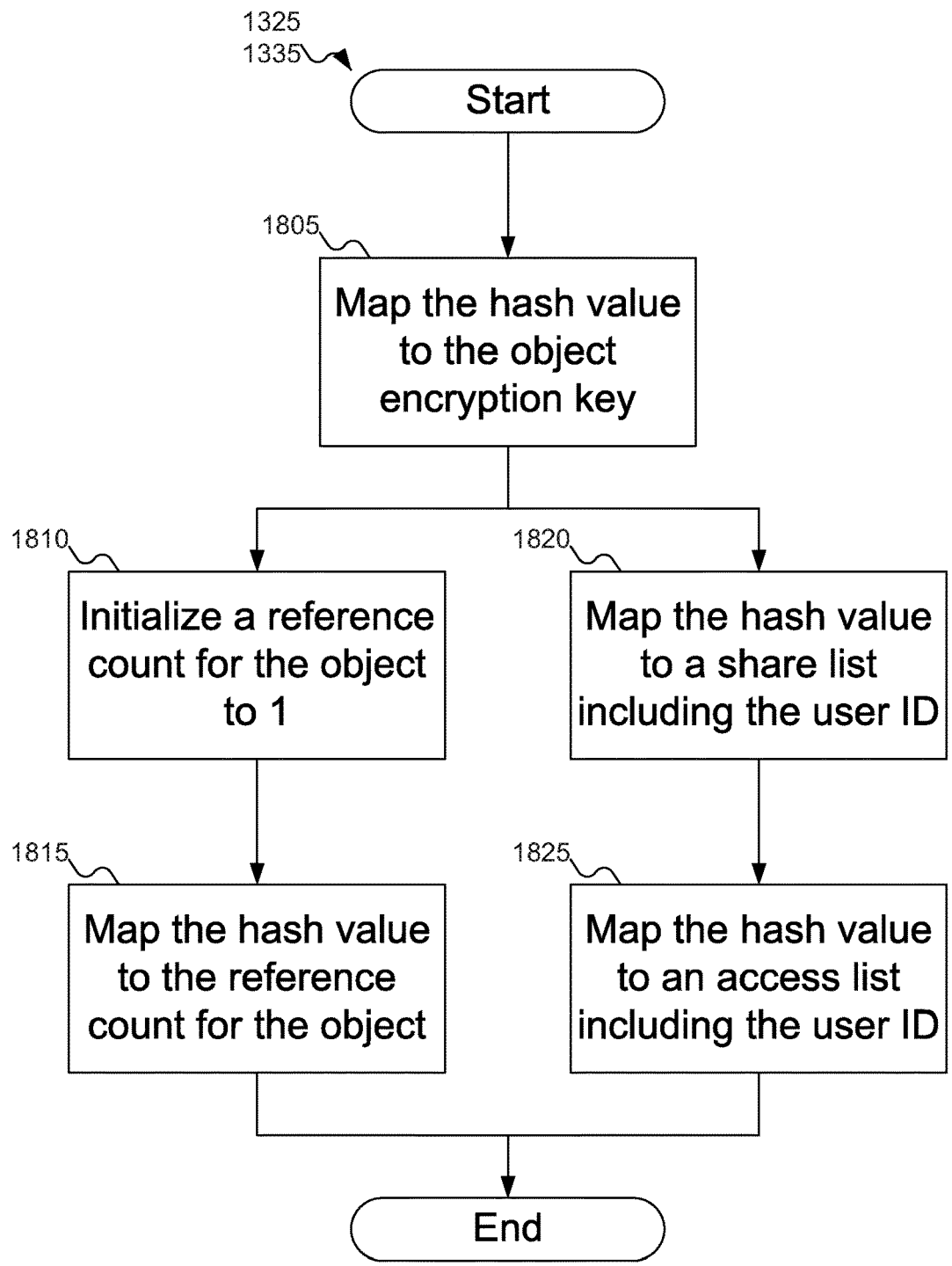
FIG. 18 shows a flowchart of an example procedure for the secure dedup manager of FIG. 5 to add a new mapping to the secure key share table of FIG. 5.

FIG. 18 shows a flowchart of an example procedure for secure dedup manager 525 of FIG. 5 to add a new mapping to secure key share table 535 of FIG. 5. In FIG. 18, at block 1805, secure dedup manager 525 of FIG. 5 may map hash value 605 of FIG. 7 to object encryption key 705 of FIG. 7.

At this point, various alternatives exist, none of which are mutually exclusive (that is, none of them may be performed, any of them may be performed, or all of them may be performed). In block 1810, secure dedup manager 525 of FIG. 5 may initialize reference count 810 of FIG. 8 to one, and at block 1815 secure dedup manager 525 of FIG. 5 may map hash value 605 of FIG. 8 to the newly initialized reference count 810 of FIG. 8. Alternatively, at block 1820, secure dedup manager 525 of FIG. 5 may map hash value 605 of FIG. 7 to share list 710 of FIG. 7, and at block 1825, secure dedup manager 525 of FIG. 5 may map hash value 605 of FIG. 6 to access list 715 of FIG. 7. (Of course, if access list 715 is omitted from secure key share table 535 of FIG. 5, then block 1825 may be omitted from FIG. 18).

Figure 19A:
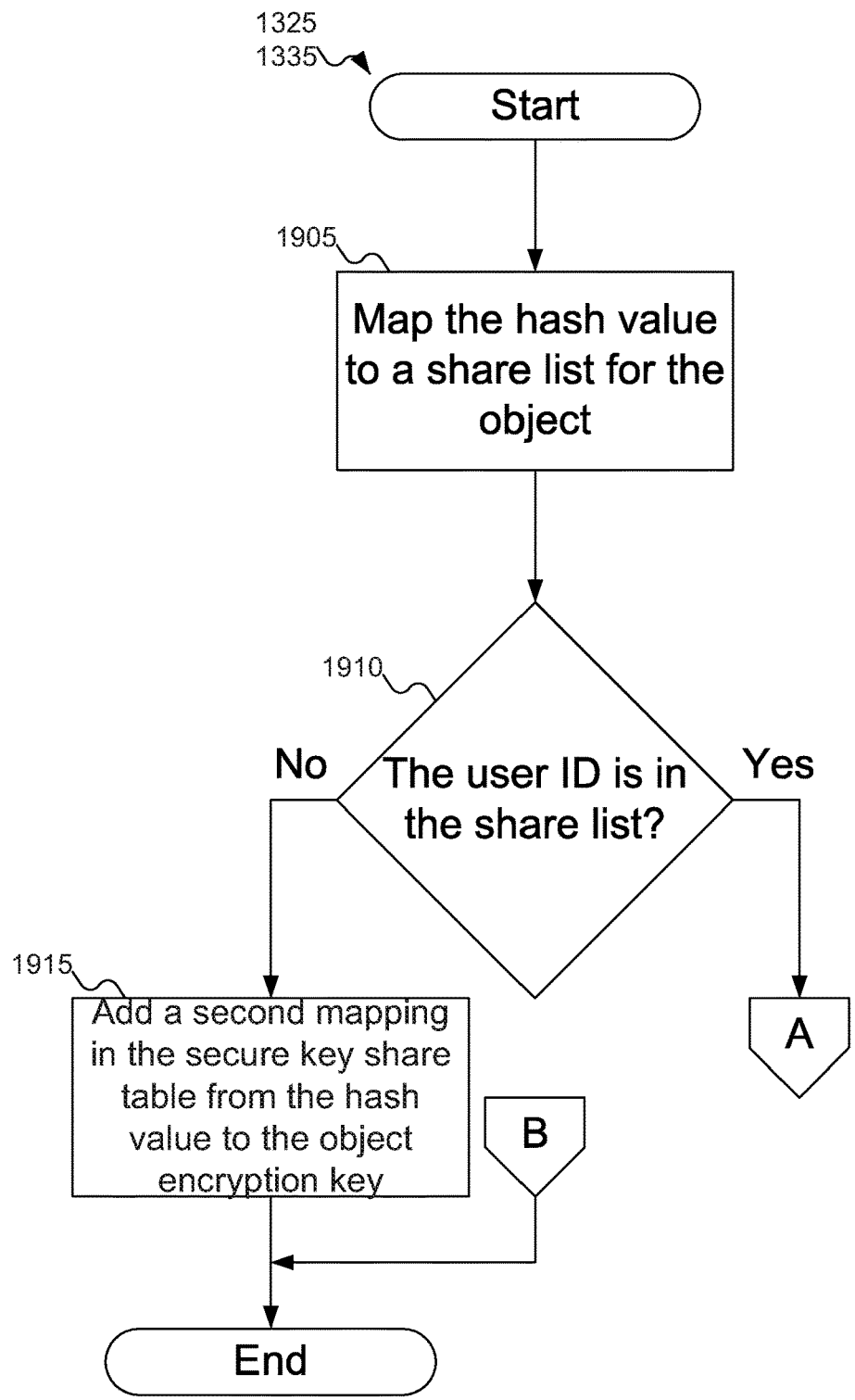
FIGS. 19A-19B show a flowchart of an example procedure for the secure dedup manager of FIG. 5 to update the secure key share table of FIG. 5.
Figure 19B:
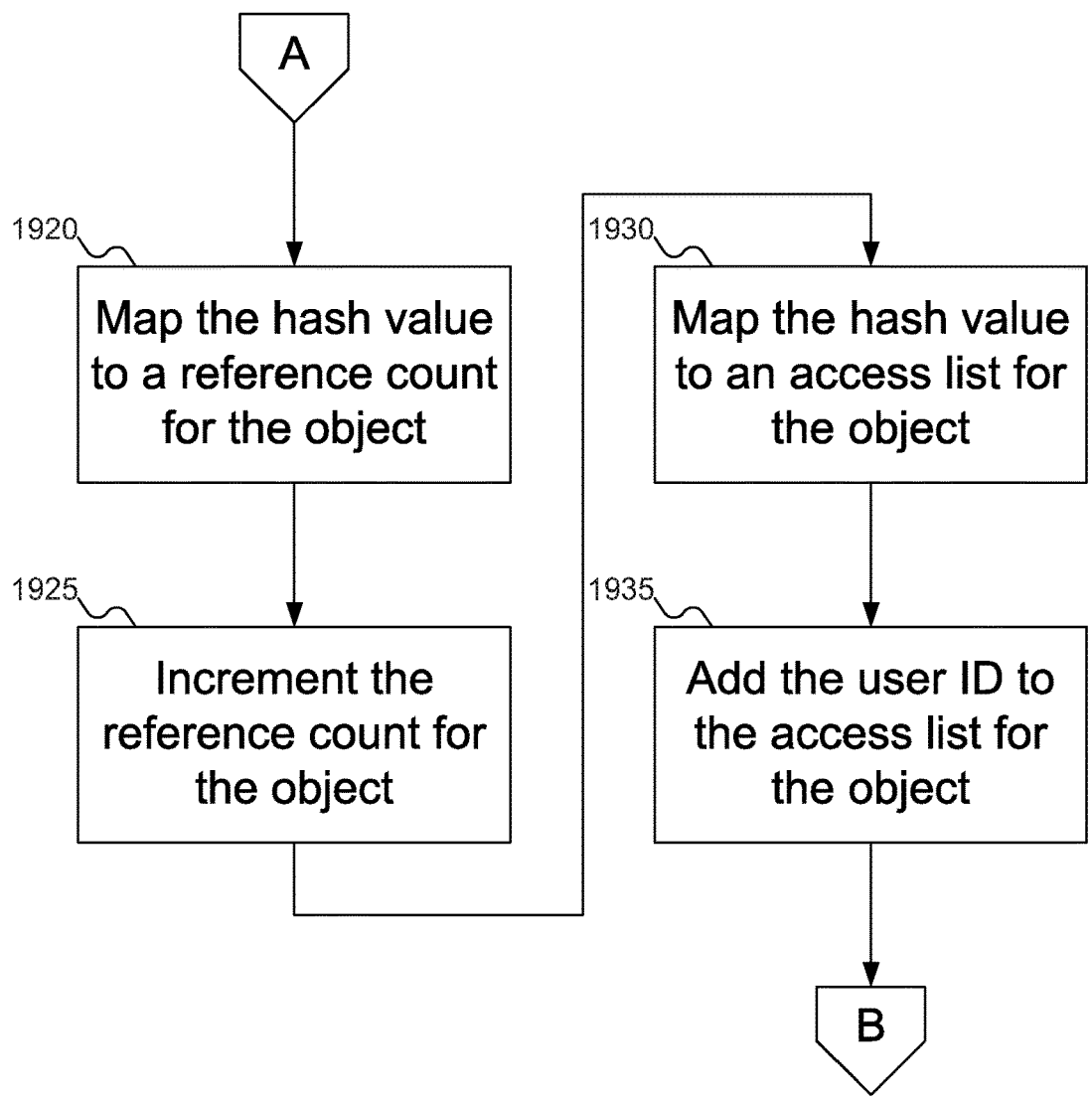

FIGS. 19A-19B show a flowchart of an example procedure for secure dedup manager 525 of FIG. 5 to update secure key share table 535 of FIG. 5. In FIG. 19A, at block 1905, secure dedup manager 525 of FIG. 5 may map hash value 605 of FIG. 7 to share list 710 of FIG. 7. At block 1910, secure dedup manager 525 of FIG. 5 may check to see if the user is listed in share list 710 of FIG. 7. If the user is not in share list 710 of FIG. 7, then at block 1915 secure dedup manager 525 of FIG. 5 may add a new mapping in secure key share table 535 of FIG. 5 from hash value 605 of FIG. 6 to an encryption key for object 405 of FIG. 4 (and may also store a new copy of object 405 of FIG. 4 on KV-SSD 120 of FIG. 1, as discussed above with reference to FIG. 13, which may also involve adding a new entry to dedup map 530 of FIG. 5).

On the other hand, if the user is in share list 710 of FIG. 7, then at block 1920 (FIG. 19B), secure dedup manager 525 of FIG. 5 may map hash value 605 of FIG. 8 to reference count 810 of FIG. 8 in dedup map 530 of FIG. 5. At block 1925, secure dedup manager 525 of FIG. 5 may increment reference count 810 of FIG. 8 in dedup map 530 of FIG. 5. Then, at block 1930, secure dedup manager 525 of FIG. 5 may map hash value 605 of FIG. 7 to access list 715 of FIG. 7, and at block 1935 secure dedup manager 530 of FIG. 5 may add the user to access list 715 of FIG. 7. Note that it may be of value to add the user to access list 715 of FIG. 7 even if the user is already present in access list 715 of FIG. 7: each occurrence of the user in access list 715 of FIG. 7 may represent a different object "written" by the user to KV-SSD 120 of FIG. 1, which may impact reference count 810 of FIG. 8. If access list 715 of FIG. 7 includes only one reference to the user despite the user having "written" multiple copies of the object to KV-SSD 120 of FIG. 1, then it may be difficult to determine (without reference to user secure object map 520-1, 520-2, or 520-3 of FIG. 5) when the user no longer owns any "copies" of the object on KV-SSD 120 of FIG. 1 (and therefore when the user may be removed from access list 715 of FIG. 7).

Figure 20A:
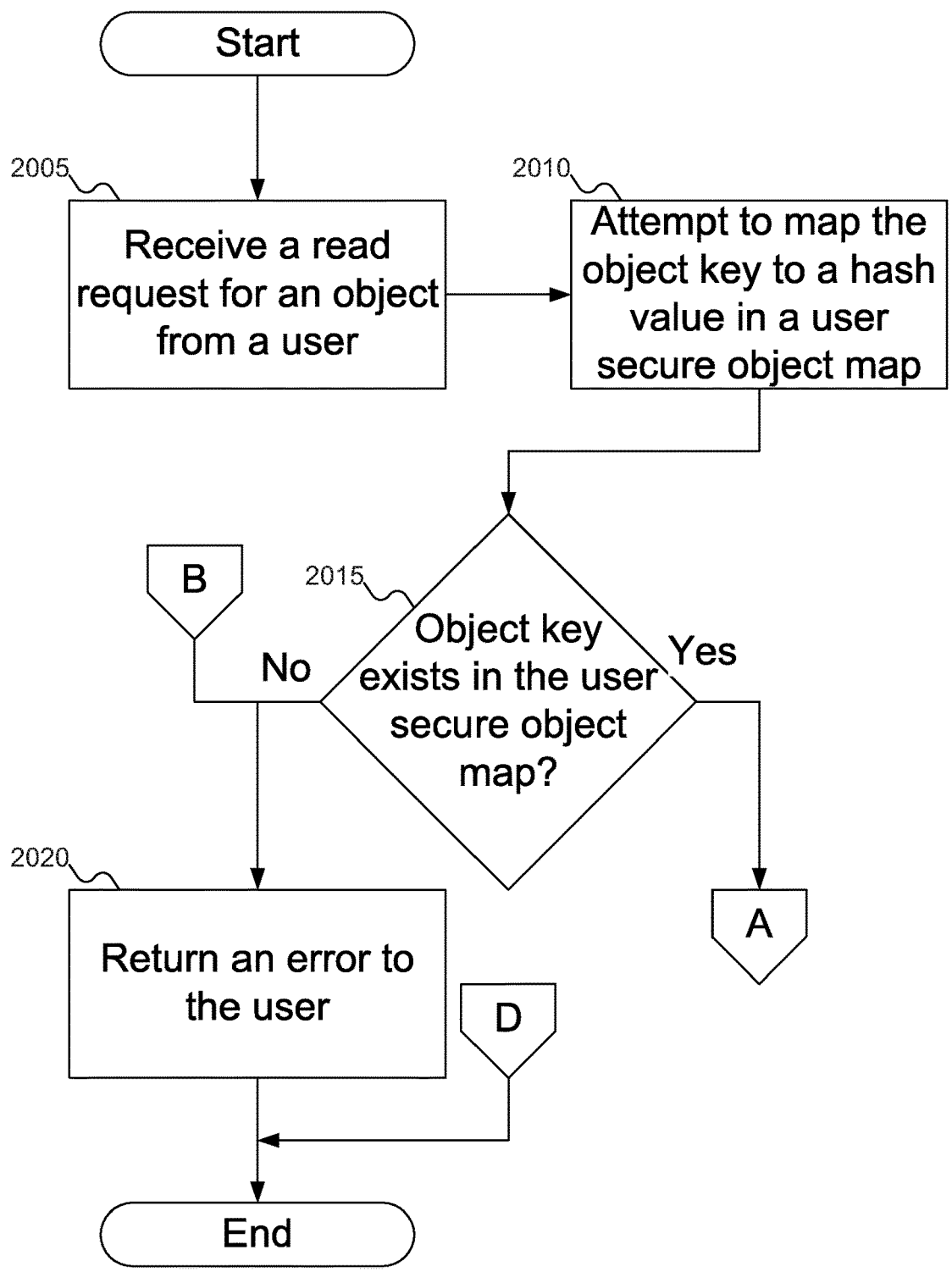
FIGS. 20A-20C shows a flowchart of an example procedure for the KV-SSD of FIG. 1 to process a read request from a user, according to an embodiment of the inventive concept.
Figure 20B:
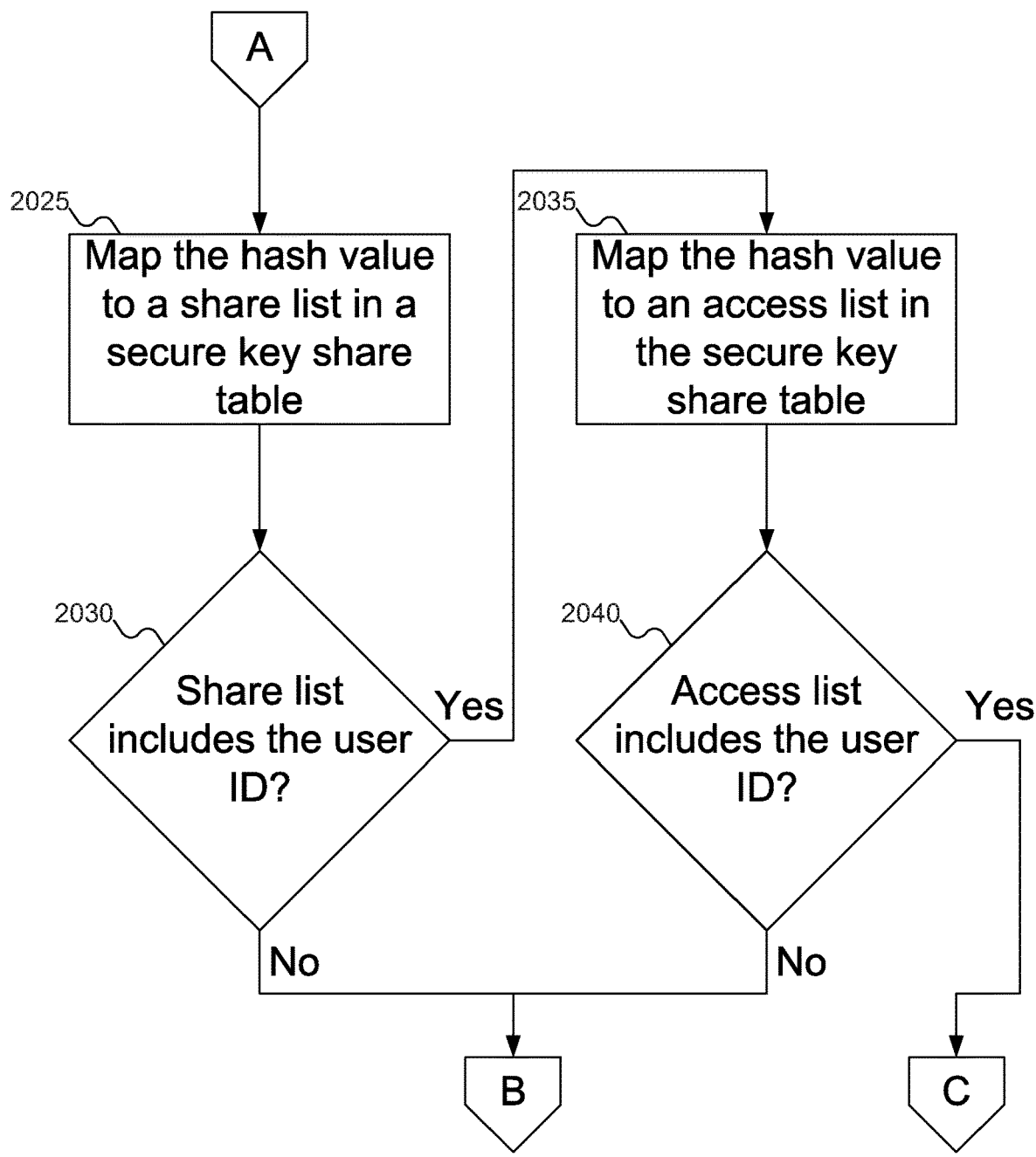
Figure 20C:
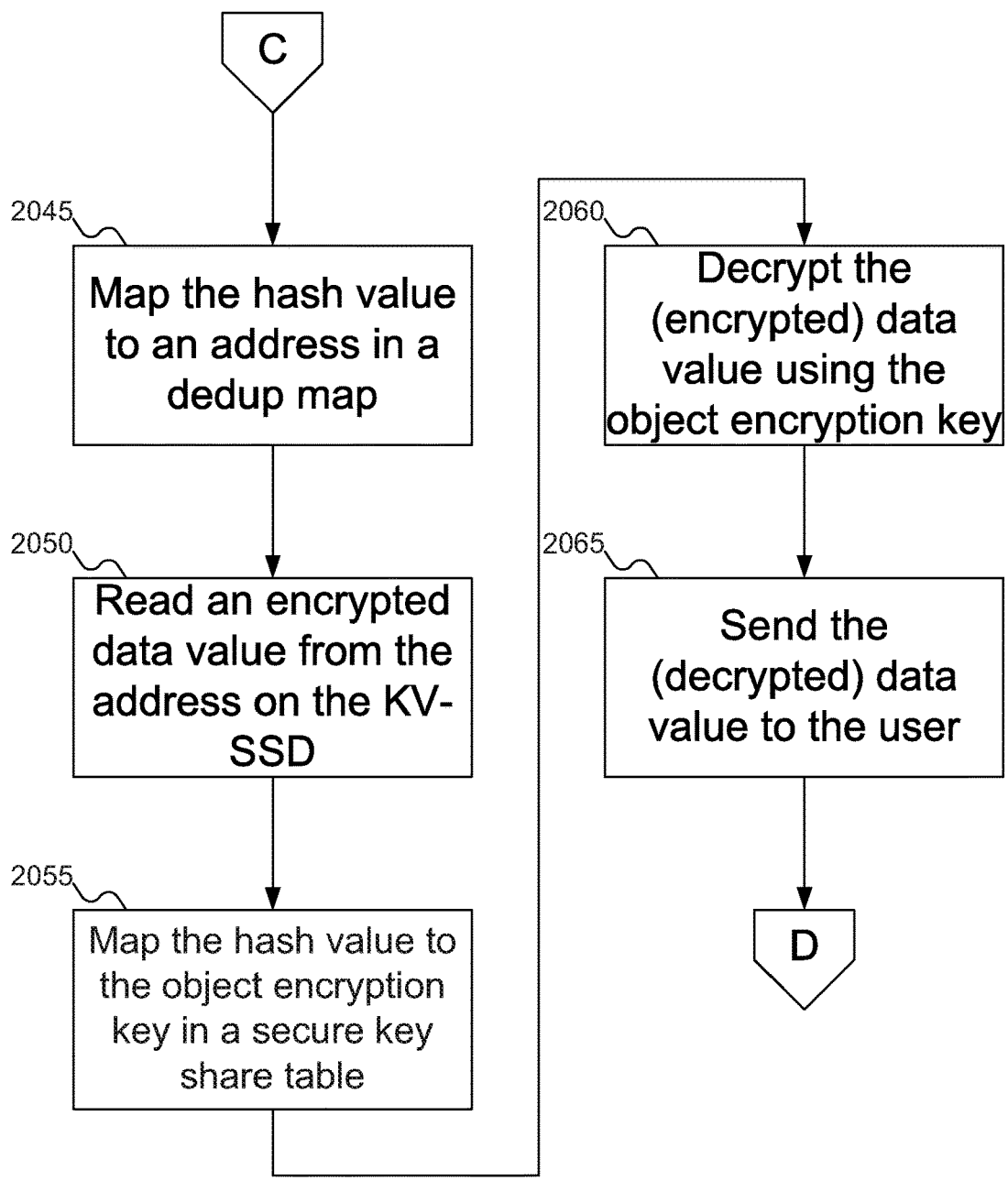

FIGS. 20A-20C shows a flowchart of an example procedure for KV-SSD 120 of FIG. 1 to process a read request from a user, according to an embodiment of the inventive concept. In FIG. 20A, at block 2005, KV-SSD 120 of FIG. 1 may receive a read request from a user. At block 2010, secure object manager 510 of FIG. 5 may attempt to map object key 410 of FIG. 6 to hash value 605 of FIG. 6 using user secure object map 520-1, 520-2, or 520-3 of FIG. 5. At block 2015, secure object manager 510 of FIG. 5 may determine whether user secure object map 520-1, 520-2, or 520-3 of FIG. 5 includes a mapping from object key 410 of FIG. 6 to hash value 605 of FIG. 6. If user secure object map 520-1, 520-2, or 520-3 of FIG. 5 does not include a mapping from object key 410 of FIG. 6 to hash value 605 of FIG. 6, then at block 2020 secure dedup 325 of FIG. 5 may return an error message indicating that the user attempted to read an object that does not exist on KV-SSD 120 of FIG. 1 (or to which the user does not have access, although for security reasons the user should not be told whether any such object exists on KV-SSD 120 of FIG. 1).

At block 2025 (FIG. 20B), secure dedup manager 525 of FIG. 5 may map hash value 605 of FIG. 7 to share list 710 of FIG. 7 using secure key share table 535 of FIG. 5. At block 2030, secure dedup manager 525 of FIG. 5 determines whether share list 710 of FIG. 7 includes the user. If share list 710 of FIG. 7 does not include the user (indicating that the user does not have permission to access the object), then secure dedup manager 525 of FIG. 5 may return to block 2020 (FIG. 20A) to return an error message to the user). Note that this test should normally succeed, since user secure object map 520-1, 520-2, or 520-3 of FIG. 5 has an entry for the object (which might not exist if the user did not own a copy of the object). Note too that secure dedup manager 525 of FIG. 5 may also return an error at this point if there is no mapping from hash value 605 of FIG. 7 to share list 710 of FIG. 7.

If share list 710 of FIG. 7 includes the user, then at block 2035 secure dedup manager 525 of FIG. 5 maps hash value 605 of FIG. 6 to access list 715 of FIG. 7, and at block 2040 secure dedup manager 525 of FIG. 5 determines if access list 715 of FIG. 7 includes the user. If access list 715 of FIG. 7 does not include the user (indicating that the user is not actively sharing the object), then secure dedup manager 525 of FIG. 5 may return to block 2020 (FIG. 20A) to return an error message to the user). Note that this test should normally succeed, since user secure object map 520-1, 520-2, or 520-3 of FIG. 5 has an entry for the object (which might not exist if the user did not own a copy of the object). Note too that secure dedup manager 525 of FIG. 5 may also return an error at this point if there is no mapping from hash value 605 of FIG. 7 to access list 715 of FIG. 7.

Assuming that the user has access to the object, then at block 2045 (FIG. 20C), secure dedup manager 525 of FIG. 5 may map hash value 605 of FIG. 8 to address 805 of FIG. 8 using dedup map 530 of FIG. 5. At block 2050, secure dedup manager 525 of FIG. 5 may read the encrypted data value 415 of FIG. 4 from address 805 of FIG. 8. At block 2055, secure dedup manager 525 of FIG. 5 may map hash value 605 of FIG. 7 to object encryption key 705 of FIG. 7. At block 2060, secure dedup manager 525 of FIG. 5 may decrypt the encrypted data value 415 of FIG. 4 using object encryption key 705 of FIG. 7. Finally, at block 2065, secure dedup 325 of FIG. 5 may return the (decrypted) data value 415 of FIG. 4 to the user.

Figure 21A:
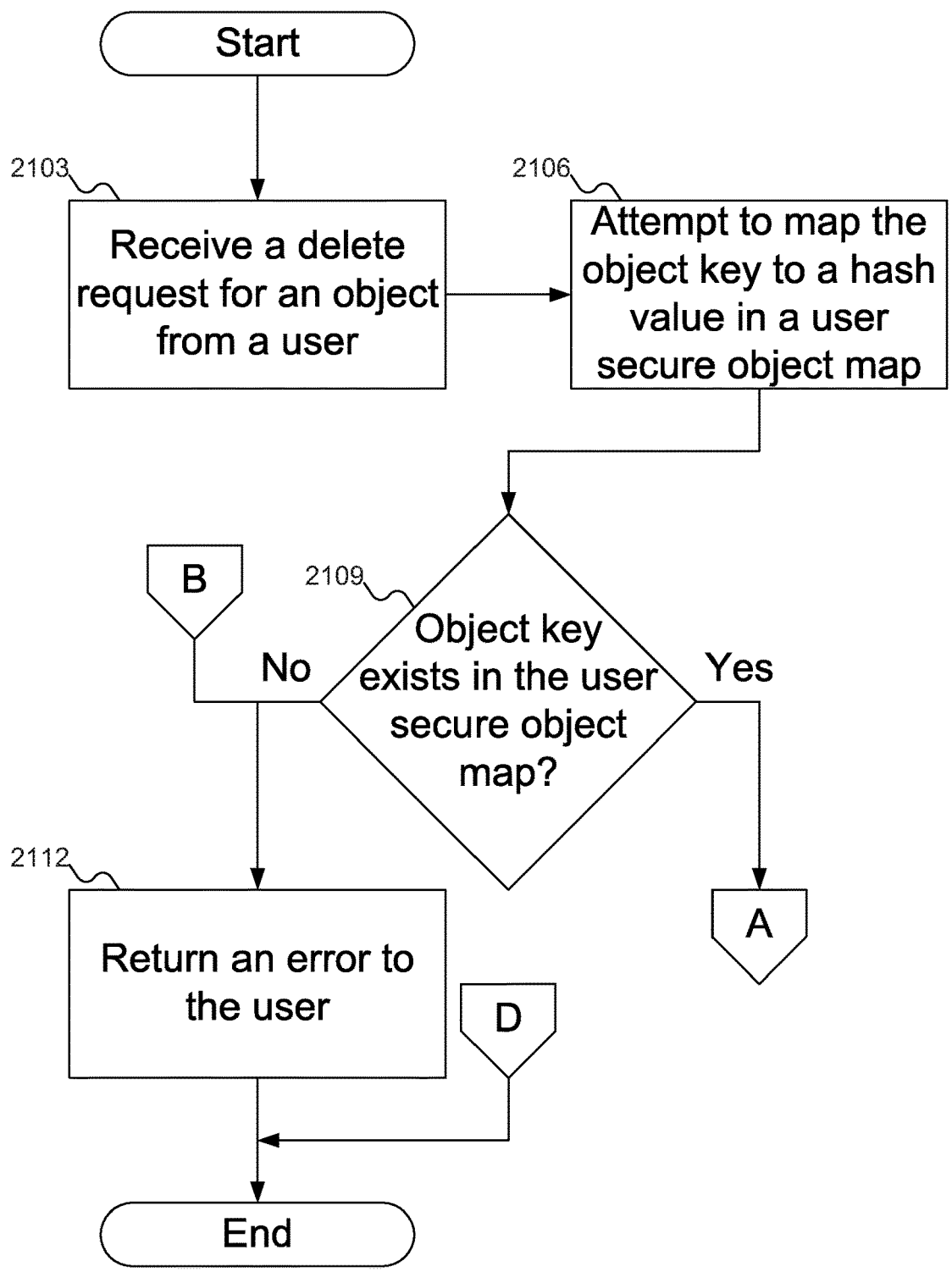
FIGS. 21A-21D shows a flowchart of an example procedure for the KV-SSD of FIG. 1 to process a delete request from a user, according to an embodiment of the inventive concept.
Figure 21B:
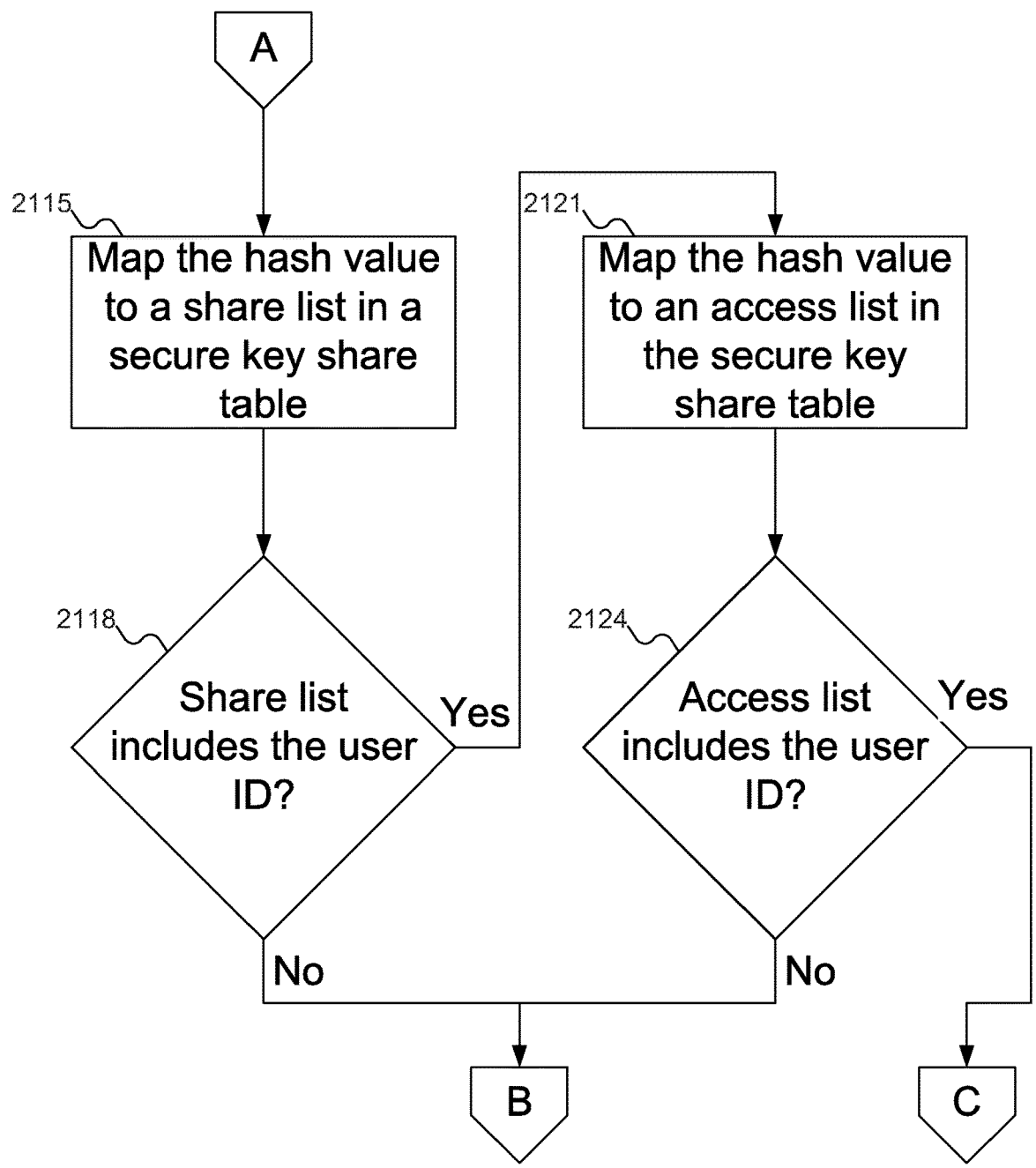
Figure 21C:
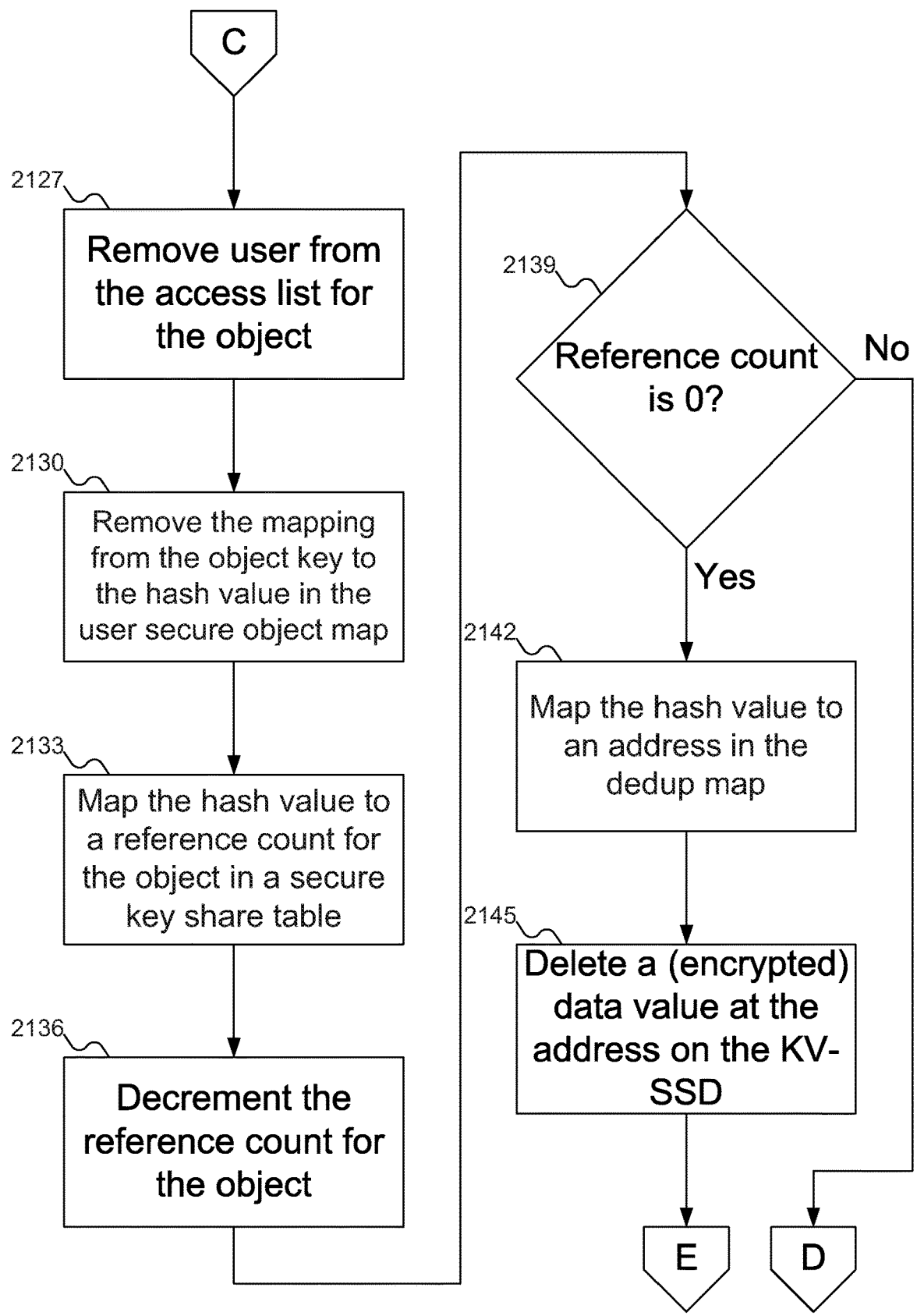
Figure 21D:
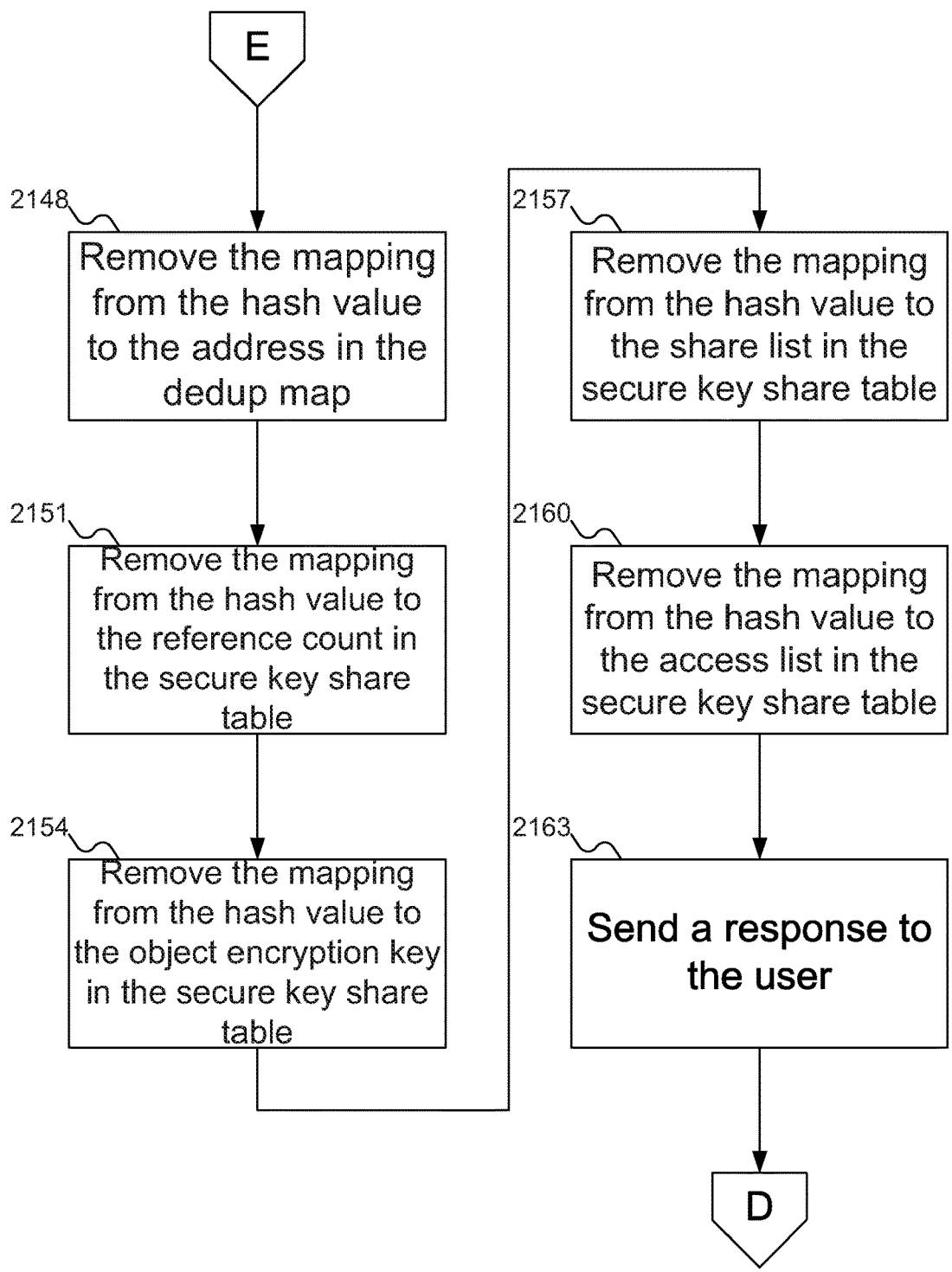

FIGS. 21A-21D shows a flowchart of an example procedure for KV-SSD 120 of FIG. 1 to process a delete request from a user, according to an embodiment of the inventive concept. In FIG. 21A, at block 2103, KV-SSD 120 of FIG. 1 may receive a delete request from a user. At block 2106, secure object manager 510 of FIG. 5 may attempt to map object key 410 of FIG. 6 to hash value 605 of FIG. 6 using user secure object map 520-1, 520-2, or 520-3 of FIG. 5. At block 2109, secure object manager 510 of FIG. 5 may determine whether user secure object map 520-1, 520-2, or 520-3 of FIG. 5 includes a mapping from object key 410 of FIG. 6 to hash value 605 of FIG. 6. If user secure object map 520-1, 520-2, or 520-3 of FIG. 5 does not include a mapping from object key 410 of FIG. 6 to hash value 605 of FIG. 6, then at block 2112 secure dedup 325 of FIG. 5 may return an error message indicating that the user attempted to read an object that does not exist on KV-SSD 120 of FIG. 1 (or to which the user does not have access, although for security reasons the user should not be told whether any such object exists on KV-SSD 120 of FIG. 1).

At block 2115 (FIG. 21B), secure dedup manager 525 of FIG. 5 may map hash value 605 of FIG. 7 to share list 710 of FIG. 7 using secure key share table 535 of FIG. 5. At block 2118, secure dedup manager 525 of FIG. 5 determines whether share list 710 of FIG. 7 includes the user. If share list 710 of FIG. 7 does not include the user (indicating that the user does not have permission to access the object), then secure dedup manager 525 of FIG. 5 may return to block 2112 (FIG. 21A) to return an error message to the user). Note that this test should normally succeed, since user secure object map 520-1, 520-2, or 520-3 of FIG. 5 has an entry for the object (which might not exist if the user did not own a copy of the object). Note too that secure dedup manager 525 of FIG. 5 may also return an error at this point if there is no mapping from hash value 605 of FIG. 7 to share list 710 of FIG. 7.

If share list 710 of FIG. 7 includes the user, then at block 2121 secure dedup manager 525 of FIG. 5 maps hash value 605 of FIG. 6 to access list 715 of FIG. 7, and at block 2124 secure dedup manager 525 of FIG. 5 determines if access list 715 of FIG. 7 includes the user. If access list 715 of FIG. 7 does not include the user (indicating that the user is not actively sharing the object), then secure dedup manager 525 of FIG. 5 may return to block 2112 (FIG. 21A) to return an error message to the user). Note that this test should normally succeed, since user secure object map 520-1, 520-2, or 520-3 of FIG. 5 has an entry for the object (which might not exist if the user did not own a copy of the object). Note too that secure dedup manager 525 of FIG. 5 may also return an error at this point if there is no mapping from hash value 605 of FIG. 7 to access list 715 of FIG. 7.

Assuming that the user has access to the object, then at block 2127 (FIG. 21C), secure dedup manager 525 of FIG. 5 may remove the user from access list 715 of FIG. 7 in secure key share table 535 of FIG. 5. At block 2130, secure object manager 510 of FIG. 5 may remove the mapping from object key 410 of FIG. 6 to hash value 605 of FIG. 6. At block 2133, secure dedup manager 525 of FIG. 5 may map hash value 605 of FIG. 8 to reference count 810 of FIG. 8 using dedup map 530 of FIG. 5. At block 2136, secure dedup manager 525 of FIG. 5 may decrement reference count 810 of FIG. 8.

At block 2139, secure dedup manager 525 of FIG. 5 may determine whether reference count 810 of FIG. 8. If reference count 810 of FIG. 8 is not zero, then processing is complete. Otherwise, at block 2142, secure dedup manager 525 of FIG. 5 may map hash value 605 of FIG. 8 to address 805 of FIG. 8, and at block 2145 secure dedup manager 525 of FIG. 5 may delete the data value stored at address 805 of FIG. 8.

Continuing at block 2148 (FIG. 21D), secure dedup manager 525 of FIG. 5 may remove the mapping from hash value 605 of FIG. 8 to address 805 of FIG. 8. At block 2151, secure dedup manager 525 of FIG. 5 may remove the mapping from hash value 605 of FIG. 8 to reference count 810 of FIG. 8 in dedup map 530 of FIG. 5. At block 2154, secure dedup manager 525 of FIG. 5 may remove the mapping from hash value 605 of FIG. 7 to object encryption key 705 of FIG. 7 in secure key share table 535 of FIG. 5. At block 2157, secure dedup manager 525 of FIG. 5 may remove the mapping from hash value 605 of FIG. 7 to share list 710 of FIG. 7 in secure key share table 535 of FIG. 5. At block 2160, secure dedup manager 525 of FIG. 5 may remove the mapping from hash value 605 of FIG. 7 to access list 715 of FIG. 7. Finally, at block 2163, secure dedup 325 of FIG. 5 may send an acknowledgment to the user that the object has been deleted.

One final general point worth noting is that the operations described above relate to deduplication secure KV devices. But this fact includes an implicit assumption: that all data stored on a secure KV device is intended to be stored securely. This assumption is not always true: that is, data that is not considered secure may be stored on a secure KV device. If an object that is not secure is stored on a KV device, data deduplication may occur as on a conventional KV device: any user might write (or overwrite) data associated with a particular object key, read data associated with a particular object key, and delete a particular object key if no security concerns exist. This fact also means that if multiple users attempt to write identical non-secure objects to a secure KV device, data deduplication may be performed on those objects without regard to any security considerations. But this variation only applies to non-secure data objects: every secure data object should be subject to the operations of secure dedup 325 of FIG. 5 as described above.

In FIGS. 13-21D, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

Embodiments of the inventive concept offer technical advantages over the prior art. In conventional systems, data deduplication either does not consider security (all possible data deduplication is performed) or data deduplication entirely defers to security considerations (and no data deduplication is performed across users). Embodiments of the inventive concept permit data deduplication to defer to security considerations but still permit cross-user data deduplication, provided that both users are intended to have access to the object. Thus, data deduplication will not occur between two copies of the same data on a secure KV device that are owned by different users and that have not shared the data. But if the two users have shared access to the data, then data deduplication may still occur. Embodiments of the inventive concept also enable a user to access an object whose data value might be encrypted using an encryption key not owned by (or associated with) the user, so long as the owner of the object has shared access to the object with that user. Thus, each user may manipulate the same shared object as a consequence of data deduplication on a secure KV device.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a Key-Value Solid State Drive (KV-SSD), comprising:

storage for data, the data including a data value encrypted using an object encryption key, the data value associated with an object key, the object key and the data value forming an object;

a user secure object map to map the object key to a hash value;

a secure key share table to map the hash value to the object encryption key; and a dedup map to map the hash value to an address in the storage for the object.

Statement 2. An embodiment of the inventive concept includes the KV-SSD according to statement 1, wherein the user secure object map is encrypted using a user key.

Statement 3. An embodiment of the inventive concept includes the KV-SSD according to statement 2, wherein the user key is not stored in the KV-SSD.

Statement 4. An embodiment of the inventive concept includes the KV-SSD according to statement 2, wherein a host computer system provides the user key to the KV-SSD.

Statement 5. An embodiment of the inventive concept includes the KV-SSD according to statement 1, wherein the user secure object map is associated with a user.

Statement 6. An embodiment of the inventive concept includes the KV-SSD according to statement 5, further comprising a plurality of user secure object maps, the plurality of user secure object maps including the user secure object map, each of the plurality of user secure object maps associated with a user from a plurality of users.

Statement 7. An embodiment of the inventive concept includes the KV-SSD according to statement 6, wherein each of the user secure object maps is encrypted using a separate user key associated with the user from the plurality of users.

Statement 8. An embodiment of the inventive concept includes the KV-SSD according to statement 1, wherein the secure key share table is encrypted using a device encryption key.

Statement 9. An embodiment of the inventive concept includes the KV-SSD according to statement 8, wherein the dedup map is encrypted using the device encryption key.

Statement 10. An embodiment of the inventive concept includes the KV-SSD according to statement 8, wherein the device encryption key is known only to the KV-SSD.

Statement 11. An embodiment of the inventive concept includes the KV-SSD according to statement 1, wherein the secure key share table 535) further maps the hash value to a share list of users that are permitted to access the object.

Statement 12. An embodiment of the inventive concept includes the KV-SSD according to statement 11, further comprising a secure dedup manager to perform deduplication of the object and a second object with the hash value using the secure key share table.

Statement 13. An embodiment of the inventive concept includes the KV-SSD according to statement 11, wherein the secure key share table further maps the hash value to an access list of users that are accessing the object.

Statement 14. An embodiment of the inventive concept includes the KV-SSD according to statement 12, wherein the dedup map further maps the hash value to a reference count of references to the data value.

Statement 15. An embodiment of the inventive concept includes a method, comprising:

receiving a write request to write an object at a Key-Value Solid State Drive (KV-SSD) from a device, the object including a data value associated with an object key;

calculating a hash value of the data value;

updating a user secure object map to map the object key to the hash value;

updating a dedup map to map the hash value to an address where the data value is stored on the KV-SSD.

Statement 16. An embodiment of the inventive concept includes the method according to statement 15, further comprising sending a response from the KV-SSD to the device, the response indicating that the data value was successfully written to the KV-SSD.

Statement 17. An embodiment of the inventive concept includes the method according to statement 15, further comprising:

receiving a user key from the device;

retrieving an encrypted user secure object map from a storage on the KV-SSD; and decrypting the encrypted user secure object map using the user key to produce the user secure object map.

Statement 18. An embodiment of the inventive concept includes the method according to statement 17, wherein:

receiving a user key from the device includes receiving the user key from the device before receiving the write request to write the object to the KV-SSD from the device; and decrypting the encrypted user secure object map using the user key to produce the user secure object map includes decrypting the encrypted user secure object map using the user key to produce the user secure object map before receiving the write request to write the object to the KV-SSD from the device.

Statement 19. An embodiment of the inventive concept includes the method according to statement 17, further comprising receiving a user identifier (ID) from the device.

Statement 20. An embodiment of the inventive concept includes the method according to statement 17, further comprising:

receiving a message from the device that the user has logged out of the device;

encrypting the user secure object map using the user key; and storing the encrypted user secure object map in the storage on the KV-SSD.

Statement 21. An embodiment of the inventive concept includes the method according to statement 20, further comprising purging the user key and the user secure object map from the KV-SSD.

Statement 22. An embodiment of the inventive concept includes the method according to statement 15, wherein updating a user secure object map to map the object key to the hash value includes adding a new entry in the user secure object map mapping the hash value to the object key.

Statement 23. An embodiment of the inventive concept includes the method according to statement 15, wherein updating a user secure object map to map the object key to the hash value includes replacing an old hash value in an existing entry in the user secure object map including the object key with the hash value.

Statement 24. An embodiment of the inventive concept includes the method according to statement 15, wherein updating a dedup map to map the hash value to the address includes:

retrieving an encrypted dedup map from a storage on the KV-SSD;

decrypting the encrypted dedup map using a device encryption key to produce the dedup map;

encrypting the dedup map using the device encryption key after updating the dedup map to store the hash value and the address to produce the encrypted dedup map; and storing the encrypted dedup map in the storage.

Statement 25. An embodiment of the inventive concept includes the method according to statement 15, wherein:

the method further comprises:

encrypting the data value using an object encryption key to produce an encrypted data value; and writing the encrypted data value at an address on the KV-SSD; and updating a dedup map to store the hash value includes adding a new entry in the dedup map mapping the hash value to the address.

Statement 26. An embodiment of the inventive concept includes the method according to statement 25, further comprising updating a secure key share table to map the hash value to an object encryption key.

Statement 27. An embodiment of the inventive concept includes the method according to statement 26, wherein updating a secure key share table to map the hash value to an object encryption key includes:

retrieving an encrypted secure key share table from a storage on the KV-SSD;

decrypting the encrypted secure key share table using a device encryption key to produce the secure key share table;

encrypting the secure key share table using the device encryption key after updating the secure key share table to produce the encrypted secure key share table; and storing the encrypted secure key share table in the storage.

Statement 28. An embodiment of the inventive concept includes the method according to statement 26, wherein updating a secure key share table to map the hash value to an object encryption key includes adding a new entry in the secure key share table mapping the hash value to the object encryption key.

Statement 29. An embodiment of the inventive concept includes the method according to statement 28, wherein adding a new entry in the secure key share table mapping the hash value to the object encryption key includes:

initializing a reference count in the secure key share table to 1; and mapping the hash value to the reference count.

Statement 30. An embodiment of the inventive concept includes the method according to statement 28, wherein adding a new entry in the secure key share table mapping the hash value to the object encryption key includes updating the secure key share table to map the hash value to a share list including a user ID associated with the write request.

Statement 31. An embodiment of the inventive concept includes the method according to statement 30, wherein adding a new entry in the secure key share table mapping the hash value to the object encryption key further includes updating the secure key share table to map the hash value to an access list including the user ID associated with the write request.

Statement 32. An embodiment of the inventive concept includes the method according to statement 26, wherein updating a secure key share table to map the hash value to an object encryption key includes:

mapping the hash value to a share list in the secure key share table;

verifying that the share list includes a user ID associated with the write request; and based at least in part on the share list including a user ID associated with the write request:

mapping the hash value to a reference count in the secure key share table; and incrementing the reference count.

Statement 33. An embodiment of the inventive concept includes the method according to statement 32, wherein updating a secure key share table to map the hash value to an object encryption key further includes:

mapping the hash value to an access list in the secure key share table; and adding the user ID to the access list.

Statement 34. An embodiment of the inventive concept includes the method according to statement 32, further comprising, based at least in part on the share list not including the user ID associated with the write request, adding a second mapping in the secure key share table from the hash value to the object encryption key and a second share list including the user ID.

Statement 35. An embodiment of the inventive concept includes a method, comprising:

receiving a read request to read an object at a Key-Value Solid State Drive (KV-SSD) from a device, the object identified by an object key;

mapping the object key to a hash value in a user secure object map;

mapping the hash value to an address in a dedup map; and reading a data value for the object from the address on the KV-SSD.

Statement 36. An embodiment of the inventive concept includes the method according to statement 35, further comprising sending a response from the KV-SSD to the device, the response including the data value that was read from the address on the KV-SSD.

Statement 37. An embodiment of the inventive concept includes the method according to statement 35, further comprising returning an error based at least in part on the object key not mapping to a hash value in the user secure object map.

Statement 38. An embodiment of the inventive concept includes the method according to statement 35, further comprising:

receiving a user key from the device;

retrieving an encrypted user secure object map from a storage on the KV-SSD; and decrypting the encrypted user secure object map using the user key to produce the user secure object map.

Statement 39. An embodiment of the inventive concept includes the method according to statement 38, wherein:

receiving a user key from the device includes receiving the user key from the device before receiving the read request to read the object at the KV-SSD from the device; and decrypting the encrypted user secure object map using the user key to produce the user secure object map includes decrypting the encrypted user secure object map using the user key to produce the user secure object map before receiving the read request to read the object at the KV-SSD from the device.

Statement 40. An embodiment of the inventive concept includes the method according to statement 38, further comprising receiving a user identifier (ID) from the device.

Statement 41. An embodiment of the inventive concept includes the method according to statement 35, wherein mapping the object key to a hash value in a user secure object map includes:

identifying an entry in the user secure object map including the object key; and identifying the hash value in the entry in the user secure object map including the object key.

Statement 42. An embodiment of the inventive concept includes the method according to statement 35, wherein mapping the hash value to an address in a dedup map includes:

identifying an entry in the dedup map including the hash value; and identifying the address in the entry in the dedup map including the hash value.

Statement 43. An embodiment of the inventive concept includes the method according to statement 42, mapping the hash value to an address in a dedup map further includes:

retrieving an encrypted dedup map from a storage on the KV-SSD; and decrypting the encrypted dedup map using a device encryption key to produce the dedup map.

Statement 44. An embodiment of the inventive concept includes the method according to statement 35, wherein reading a data value for the object from the address on the KV-SSD includes:

reading an encrypted data value for the object from the address on the KV-SSD; and decrypting the encrypted data value using an object encryption key.

Statement 45. An embodiment of the inventive concept includes the method according to statement 44, wherein decrypting the encrypted data value using an object encryption key includes mapping the hash value to the object encryption key in a secure key share table.

Statement 46. An embodiment of the inventive concept includes the method according to statement 45, wherein mapping the hash value to the object encryption key in the secure key share table includes:

identifying an entry in the secure key share table including the hash value; and identifying the object encryption key in the entry in the secure key share table including the hash value.

Statement 47. An embodiment of the inventive concept includes the method according to statement 45, wherein mapping the hash value to the object encryption key in a secure key share table includes:

mapping the hash value to a share list in the secure key share table; and verifying that the share list includes a user ID associated with the read request.

Statement 48. An embodiment of the inventive concept includes the method according to statement 47, wherein mapping the hash value to a share list in the secure key share table includes:

identifying an entry in the secure key share table including the hash value; and identifying the share list in the entry in the secure key share table including the hash value.

Statement 49. An embodiment of the inventive concept includes the method according to statement 47, further comprising returning an error based at least in part on the share list not including the user ID associated with the read request.

Statement 50. An embodiment of the inventive concept includes the method according to statement 47, wherein mapping the hash value to the object encryption key in a secure key share table further includes:

mapping the hash value to an access list in the secure key share table; and verifying that the access list includes the user ID associated with the read request.

Statement 51. An embodiment of the inventive concept includes the method according to statement 50, wherein mapping the hash value to an access list in the secure key share table includes:

identifying an entry in the secure key share table including the hash value; and identifying the access list in the entry in the secure key share table including the hash value.

Statement 52. An embodiment of the inventive concept includes the method according to statement 50, further comprising returning an error based at least in part on the access list not including the user ID associated with the read request.

Statement 53. An embodiment of the inventive concept includes the method according to statement 45, wherein mapping the hash value to the object encryption key in a secure key share table includes:

retrieving an encrypted secure key share table from a storage on the KV-SSD; and decrypting the encrypted secure key share table using a device encryption key to produce the secure key share table.

Statement 54. An embodiment of the inventive concept includes a method, comprising: receiving a delete request to delete an object at a Key-Value Solid State Drive (KV-SSD) from a device, the object identified by an object key;

mapping the object key to a hash value in a user secure object map;

mapping the hash value to a reference count in a secure key share table; and decrementing the reference count.

Statement 55. An embodiment of the inventive concept includes the method according to statement 54, further comprising sending a response from the KV-SSD to the device, the response indicating that the data value was successfully deleted from the KV-SSD.

Statement 56. An embodiment of the inventive concept includes the method according to statement 54, further comprising returning an error based at least in part on the object key not mapping to a hash value in the user secure object map.

Statement 57. An embodiment of the inventive concept includes the method according to statement 54, further comprising:

receiving a user key from the device;

retrieving an encrypted user secure object map from a storage on the KV-SSD; and decrypting the encrypted user secure object map using the user key to produce the user secure object map.

Statement 58. An embodiment of the inventive concept includes the method according to statement 57, wherein:

receiving a user key from the device includes receiving the user key from the device before receiving the delete request to delete the object at the KV-SSD from the device; and decrypting the encrypted user secure object map using the user key to produce the user secure object map includes decrypting the encrypted user secure object map using the user key to produce the user secure object map before receiving the delete request to delete the object at the KV-SSD from the device.

Statement 59. An embodiment of the inventive concept includes the method according to statement 57, further comprising receiving a user identifier (ID) from the device.

Statement 60. An embodiment of the inventive concept includes the method according to statement 54, wherein mapping the object key to a hash value in a user secure object map includes:
identifying an entry in the user secure object map including the object key; and
identifying the hash value in the entry in the user secure object map including the object key.

Statement 61. An embodiment of the inventive concept includes the method according to statement 54, wherein mapping the hash value to a reference count in a secure key share table includes:
identifying an entry in the secure key share table including the hash value; and
identifying the reference count in the entry in the secure key share table including the hash value.

Statement 62. An embodiment of the inventive concept includes the method according to statement 61, mapping the hash value to a reference count in a secure key share table further includes:
retrieving an encrypted secure key share table from a storage on the KV-SSD; and
decrypting the encrypted secure key share table using a device encryption key to produce the secure key share table.

Statement 63. An embodiment of the inventive concept includes the method according to statement 54, wherein decrementing the reference count includes:
mapping the hash value to a share list in the secure key share table;
verifying that the share list includes a user ID associated with the delete request; and
based at least in part on the share list including the user ID associated with the delete request, decrementing the reference count.

Statement 64. An embodiment of the inventive concept includes the method according to statement 63, further comprising returning an error based at least in part on the share list not including the user ID associated with the delete request.

Statement 65. An embodiment of the inventive concept includes the method according to statement 63, wherein decrementing the reference count further includes:
mapping the hash value to an access list in the secure key share table;
verifying that the access list includes a user ID associated with the delete request; and
based at least in part on the access list including the user ID associated with the delete request, decrementing the reference count.

Statement 66. An embodiment of the inventive concept includes the method according to statement 65, further comprising returning an error based at least in part on the access list not including the user ID associated with the delete request.

Statement 67. An embodiment of the inventive concept includes the method according to statement 54, further comprising removing the mapping from the object key to the hash value in the user secure object map.

Statement 68. An embodiment of the inventive concept includes the method according to statement 54, further comprising:
mapping the hash value to an address in a dedup map; and
deleting a data value at the address on the KV-SSD.

Statement 69. An embodiment of the inventive concept includes the method according to statement 68, wherein deleting a data value at the address on the KV-SSD includes deleting the data value at the address on the KV-SSD based at least in part on the reference count being 0.

Statement 70. An embodiment of the inventive concept includes the method according to statement 68, wherein mapping the hash value to an address in a dedup map includes:
retrieving an encrypted dedup map from a storage on the KV-SSD; and
decrypting the encrypted dedup map using a device encryption key to produce the dedup map.

Statement 71. An embodiment of the inventive concept includes the method according to statement 68, further comprising:
removing the mapping from the hash value to the reference count in the secure key share table; and
removing the mapping from the hash value to the address in the dedup map.

Statement 72. An embodiment of the inventive concept includes the method according to statement 71, wherein removing the mapping from the hash value to the reference count in the secure key share table includes removing the mapping from the hash value to an object encryption key in the secure key share table.

Statement 73. An embodiment of the inventive concept includes the method according to statement 71, wherein removing the mapping from the hash value to the reference count in the secure key share table includes removing the mapping from the hash value to a share list in the secure key share table.

Statement 74. An embodiment of the inventive concept includes the method according to statement 73, wherein removing the mapping from the hash value to a share list in the secure key share table includes removing the mapping from the hash value to an access list in the secure key share table.

Statement 75. An embodiment of the inventive concept includes an article, comprising a non-transitory storage medium, the non-transitory storage medium having stored thereon instructions that, when executed by a machine, result in:
receiving a write request to write an object at a Key-Value Solid State Drive (KV-SSD) from a device, the object including a data value associated with an object key;
calculating a hash value of the data value;
updating a user secure object map to map the object key to the hash value;
updating a dedup map to map the hash value to an address where the data value is stored on the KV-SSD.

Statement 76. An embodiment of the inventive concept includes the article according to statement 75, the non-transitory storage medium having stored thereon further instructions that, when executed by the machine, result in sending a response from the KV-SSD to the device, the response indicating that the data value was successfully written to the KV-SSD.

Statement 77. An embodiment of the inventive concept includes the article according to statement 75, the non-transitory storage medium having stored thereon further instructions that, when executed by the machine, result in:

receiving a user key from the device;

retrieving an encrypted user secure object map from a storage on the KV-SSD; and decrypting the encrypted user secure object map using the user key to produce the user secure object map.

Statement 78. An embodiment of the inventive concept includes the article according to statement 77, wherein:

receiving a user key from the device includes receiving the user key from the device before receiving the write request to write the object to the KV-SSD from the device; and decrypting the encrypted user secure object map using the user key to produce the user secure object map includes decrypting the encrypted user secure object map using the user key to produce the user secure object map before receiving the write request to write the object to the KV-SSD from the device.

Statement 79. An embodiment of the inventive concept includes the article according to statement 77, the non-transitory storage medium having stored thereon further instructions that, when executed by the machine, result in receiving a user identifier (ID) from the device.

Statement 80. An embodiment of the inventive concept includes the article according to statement 77, the non-transitory storage medium having stored thereon further instructions that, when executed by the machine, result in:

receiving a message from the device that the user has logged out of the device;

encrypting the user secure object map using the user key; and storing the encrypted user secure object map in the storage on the KV-SSD.

Statement 81. An embodiment of the inventive concept includes the article according to statement 80, the non-transitory storage medium having stored thereon further instructions that, when executed by the machine, result in purging the user key and the user secure object map from the KV-SSD.

Statement 82. An embodiment of the inventive concept includes the article according to statement 75, wherein updating a user secure object map to map the object key to the hash value includes adding a new entry in the user secure object map mapping the hash value to the object key.

Statement 83. An embodiment of the inventive concept includes the article according to statement 75, wherein updating a user secure object map to map the object key to the hash value includes replacing an old hash value in an existing entry in the user secure object map including the object key with the hash value.

Statement 84. An embodiment of the inventive concept includes the article according to statement 75, wherein updating a dedup map to map the hash value to the address includes:

retrieving an encrypted dedup map from a storage on the KV-SSD;

decrypting the encrypted dedup map using a device encryption key to produce the dedup map;

encrypting the dedup map using the device encryption key after updating the dedup map to store the hash value and the address to produce the encrypted dedup map; and storing the encrypted dedup map in the storage.

Statement 85. An embodiment of the inventive concept includes the article according to statement 75, wherein:

the method further comprises:

encrypting the data value using an object encryption key to produce an encrypted data value; and writing the encrypted data value at an address on the KV-SSD; and updating a dedup map to store the hash value includes adding a new entry in the dedup map mapping the hash value to the address.

Statement 86. An embodiment of the inventive concept includes the article according to statement 85, the non-transitory storage medium having stored thereon further instructions that, when executed by the machine, result in updating a secure key share table to map the hash value to an object encryption key.

Statement 87. An embodiment of the inventive concept includes the article according to statement 86, wherein updating a secure key share table to map the hash value to an object encryption key includes:

retrieving an encrypted secure key share table from a storage on the KV-SSD;

decrypting the encrypted secure key share table using a device encryption key to produce the secure key share table;

encrypting the secure key share table using the device encryption key after updating the secure key share table to produce the encrypted secure key share table; and storing the encrypted secure key share table in the storage.

Statement 88. An embodiment of the inventive concept includes the article according to statement 86, wherein updating a secure key share table to map the hash value to an object encryption key includes adding a new entry in the secure key share table mapping the hash value to the object encryption key.

Statement 89. An embodiment of the inventive concept includes the article according to statement 88, wherein adding a new entry in the secure key share table mapping the hash value to the object encryption key includes:

initializing a reference count in the secure key share table to 1; and mapping the hash value to the reference count.

Statement 90. An embodiment of the inventive concept includes the article according to statement 88, wherein adding a new entry in the secure key share table mapping the hash value to the object encryption key includes updating the secure key share table to map the hash value to a share list including a user ID associated with the write request.

Statement 91. An embodiment of the inventive concept includes the article according to statement 90, wherein adding a new entry in the secure key share table mapping the hash value to the object encryption key further includes updating the secure key share table to map the hash value to an access list including the user ID associated with the write request.

Statement 92. An embodiment of the inventive concept includes the article according to statement 86, wherein updating a secure key share table to map the hash value to an object encryption key includes:

mapping the hash value to a share list in the secure key share table;

verifying that the share list includes a user ID associated with the write request; and based at least in part on the share list including a user ID associated with the write request:

mapping the hash value to a reference count in the secure key share table; and incrementing the reference count.

Statement 93. An embodiment of the inventive concept includes the article according to statement 92, wherein updating a secure key share table to map the hash value to an object encryption key further includes:

mapping the hash value to an access list in the secure key share table; and adding the user ID to the access list.

Statement 94. An embodiment of the inventive concept includes the article according to statement 92, the non-transitory storage medium having stored thereon further instructions that, when executed by the machine, result in, based at least in part on the share list not including the user ID associated with the write request, adding a second mapping in the secure key share table from the hash value to the object encryption key and a second share list including the user ID.

Statement 95. An embodiment of the inventive concept includes an article, comprising a non-transitory storage medium, the non-transitory storage medium having stored thereon instructions that, when executed by a machine, result in:

receiving a read request to read an object at a Key-Value Solid State Drive (KV-SSD) from a device, the object identified by an object key;

mapping the object key to a hash value in a user secure object map;

mapping the hash value to an address in a dedup map; and reading a data value for the object from the address on the KV-SSD.

Statement 96. An embodiment of the inventive concept includes the article according to statement 95, the non-transitory storage medium having stored thereon further instructions that, when executed by the machine, result in sending a response from the KV-SSD to the device, the response including the data value that was read from the address on the KV-SSD.

Statement 97. An embodiment of the inventive concept includes the article according to statement 95, the non-transitory storage medium having stored thereon further instructions that, when executed by the machine, result in returning an error based at least in part on the object key not mapping to a hash value in the user secure object map.

Statement 98. An embodiment of the inventive concept includes the article according to statement 95, the non-transitory storage medium having stored thereon further instructions that, when executed by the machine, result in:

receiving a user key from the device;

retrieving an encrypted user secure object map from a storage on the KV-SSD; and decrypting the encrypted user secure object map using the user key to produce the user secure object map.

Statement 99. An embodiment of the inventive concept includes the article according to statement 98, wherein:

receiving a user key from the device includes receiving the user key from the device before receiving the read request to read the object at the KV-SSD from the device; and decrypting the encrypted user secure object map using the user key to produce the user secure object map includes decrypting the encrypted user secure object map using the user key to produce the user secure object map before receiving the read request to read the object at the KV-SSD from the device.

Statement 100. An embodiment of the inventive concept includes the article according to statement 98, the non-transitory storage medium having stored thereon further instructions that, when executed by the machine, result in receiving a user identifier (ID) from the device.

Statement 101. An embodiment of the inventive concept includes the article according to statement 95, wherein mapping the object key to a hash value in a user secure object map includes:

identifying an entry in the user secure object map including the object key; and identifying the hash value in the entry in the user secure object map including the object key.

Statement 102. An embodiment of the inventive concept includes the article according to statement 95, wherein mapping the hash value to an address in a dedup map includes:

identifying an entry in the dedup map including the hash value; and identifying the address in the entry in the dedup map including the hash value.

Statement 103. An embodiment of the inventive concept includes the article according to statement 102, mapping the hash value to an address in a dedup map further includes:

retrieving an encrypted dedup map from a storage on the KV-SSD; and decrypting the encrypted dedup map using a device encryption key to produce the dedup map.

Statement 104. An embodiment of the inventive concept includes the article according to statement 95, wherein reading a data value for the object from the address on the KV-SSD includes:

reading an encrypted data value for the object from the address on the KV-SSD; and decrypting the encrypted data value using an object encryption key.

Statement 105. An embodiment of the inventive concept includes the article according to statement 104, wherein decrypting the encrypted data value using an object encryption key includes mapping the hash value to the object encryption key in a secure key share table.

Statement 106. An embodiment of the inventive concept includes the article according to statement 105, wherein mapping the hash value to the object encryption key in the secure key share table includes:

identifying an entry in the secure key share table including the hash value; and identifying the object encryption key in the entry in the secure key share table including the hash value.

Statement 107. An embodiment of the inventive concept includes the article according to statement 105, wherein mapping the hash value to the object encryption key in a secure key share table includes:

mapping the hash value to a share list in the secure key share table; and verifying that the share list includes a user ID associated with the read request.

Statement 108. An embodiment of the inventive concept includes the article according to statement 107, wherein mapping the hash value to a share list in the secure key share table includes:

identifying an entry in the secure key share table including the hash value; and identifying the share list in the entry in the secure key share table including the hash value.

Statement 109. An embodiment of the inventive concept includes the article according to statement 107, the non-transitory storage medium having stored thereon further instructions that, when executed by the machine, result in returning an error based at least in part on the share list not including the user ID associated with the read request.

Statement 110. An embodiment of the inventive concept includes the article according to statement 107, wherein mapping the hash value to the object encryption key in a secure key share table further includes:

mapping the hash value to an access list in the secure key share table; and verifying that the access list includes the user ID associated with the read request.

Statement 111. An embodiment of the inventive concept includes the article according to statement 110, wherein mapping the hash value to an access list in the secure key share table includes:

identifying an entry in the secure key share table including the hash value; and identifying the access list in the entry in the secure key share table including the hash value.

Statement 112. An embodiment of the inventive concept includes the article according to statement 110, the non-transitory storage medium having stored thereon further instructions that, when executed by the machine, result in returning an error based at least in part on the access list not including the user ID associated with the read request.

Statement 113. An embodiment of the inventive concept includes the article according to statement 105, wherein mapping the hash value to the object encryption key in a secure key share table includes:

retrieving an encrypted secure key share table from a storage on the KV-SSD; and decrypting the encrypted secure key share table using a device encryption key to produce the secure key share table.

Statement 114. An embodiment of the inventive concept includes an article, comprising a non-transitory storage medium, the non-transitory storage medium having stored thereon instructions that, when executed by a machine, result in:

receiving a delete request to delete an object at a Key-Value Solid State Drive (KV-SSD) from a device, the object identified by an object key;

mapping the object key to a hash value in a user secure object map;

mapping the hash value to a reference count in a secure key share table; and decrementing the reference count.

Statement 115. An embodiment of the inventive concept includes the article according to statement 114, the non-transitory storage medium having stored thereon further instructions that, when executed by the machine, result in sending a response from the KV-SSD to the device, the response indicating that the data value was successfully deleted from the KV-SSD.

Statement 116. An embodiment of the inventive concept includes the article according to statement 114, the non-transitory storage medium having stored thereon further instructions that, when executed by the machine, result in returning an error based at least in part on the object key not mapping to a hash value in the user secure object map.

Statement 117. An embodiment of the inventive concept includes the article according to statement 114, the non-transitory storage medium having stored thereon further instructions that, when executed by the machine, result in:

receiving a user key from the device;

retrieving an encrypted user secure object map from a storage on the KV-SSD; and decrypting the encrypted user secure object map using the user key to produce the user secure object map.

Statement 118. An embodiment of the inventive concept includes the article according to statement 117, wherein:

receiving a user key from the device includes receiving the user key from the device before receiving the delete request to delete the object at the KV-SSD from the device; and decrypting the encrypted user secure object map using the user key to produce the user secure object map includes decrypting the encrypted user secure object map using the user key to produce the user secure object map before receiving the delete request to delete the object at the KV-SSD from the device.

Statement 119. An embodiment of the inventive concept includes the article according to statement 117, the non-transitory storage medium having stored thereon further instructions that, when executed by the machine, result in receiving a user identifier (ID) from the device.

Statement 120. An embodiment of the inventive concept includes the article according to statement 114, wherein mapping the object key to a hash value in a user secure object map includes:

identifying an entry in the user secure object map including the object key; and identifying the hash value in the entry in the user secure object map including the object key.

Statement 121. An embodiment of the inventive concept includes the article according to statement 114, wherein mapping the hash value to a reference count in a secure key share table includes:

identifying an entry in the secure key share table including the hash value; and identifying the reference count in the entry in the secure key share table including the hash value.

Statement 122. An embodiment of the inventive concept includes the article according to statement 121, mapping the hash value to a reference count in a secure key share table further includes:

retrieving an encrypted secure key share table from a storage on the KV-SSD; and decrypting the encrypted secure key share table using a device encryption key to produce the secure key share table.

Statement 123. An embodiment of the inventive concept includes the article according to statement 114, wherein decrementing the reference count includes:

mapping the hash value to a share list in the secure key share table;

verifying that the share list includes a user ID associated with the delete request; and based at least in part on the share list including the user ID associated with the delete request, decrementing the reference count.

Statement 124. An embodiment of the inventive concept includes the article according to statement 123, the non-transitory storage medium having stored thereon further instructions that, when executed by the machine, result in returning an error based at least in part on the share list not including the user ID associated with the delete request.

Statement 125. An embodiment of the inventive concept includes the article according to statement 123, wherein decrementing the reference count further includes:

mapping the hash value to an access list in the secure key share table;

verifying that the access list includes a user ID associated with the delete request; and based at least in part on the access list including the user ID associated with the delete request, decrementing the reference count.

Statement 126. An embodiment of the inventive concept includes the article according to statement 125, the non-transitory storage medium having stored thereon further instructions that, when executed by the machine, result in returning an error based at least in part on the access list not including the user ID associated with the delete request.

Statement 127. An embodiment of the inventive concept includes the article according to statement 114, the non-transitory storage medium having stored thereon further instructions that, when executed by the machine, result in removing the mapping from the object key to the hash value in the user secure object map.

Statement 128. An embodiment of the inventive concept includes the article according to statement 114, the non-transitory storage medium having stored thereon further instructions that, when executed by the machine, result in:

mapping the hash value to an address in a dedup map; and deleting a data value at the address on the KV-SSD.

Statement 129. An embodiment of the inventive concept includes the article according to statement 128, wherein deleting a data value at the address on the KV-SSD includes deleting the data value at the address on the KV-SSD based at least in part on the reference count being 0.

Statement 130. An embodiment of the inventive concept includes the article according to statement 128, wherein mapping the hash value to an address in a dedup map includes:

retrieving an encrypted dedup map from a storage on the KV-SSD; and decrypting the encrypted dedup map using a device encryption key to produce the dedup map.

Statement 131. An embodiment of the inventive concept includes the article according to statement 128, the non-transitory storage medium having stored thereon further instructions that, when executed by the machine, result in:

removing the mapping from the hash value to the reference count in the secure key share table; and removing the mapping from the hash value to the address in the dedup map.

Statement 132. An embodiment of the inventive concept includes the article according to statement 131, wherein removing the mapping from the hash value to the reference count in the secure key share table includes removing the mapping from the hash value to an object encryption key in the secure key share table.

Statement 133. An embodiment of the inventive concept includes the article according to statement 131, wherein removing the mapping from the hash value to the reference count in the secure key share table includes removing the mapping from the hash value to a share list in the secure key share table.

Statement 134. An embodiment of the inventive concept includes the article according to statement 133, wherein removing the mapping from the hash value to a share list in the secure key share table includes removing the mapping from the hash value to an access list in the secure key share table.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A Key-Value Solid State Drive (KV-SSD), comprising:
   storage for data, the data including a data value encrypted using an object encryption key, the data value associated with an object key, the object key and the data value forming an object;
   a user secure object map to map the object key to a hash value, the user secure object map associated with a user;
   a secure key share table to map the hash value to the object encryption key, the object encryption key associated with a second user; and
   a dedup map to map the hash value to an address in the storage for the object,
   wherein the KV-SSD grants access to the user to the object based at least in part on the user secure object map mapping the object key to the hash value.

2. The KV-SSD according to claim 1, wherein the user secure object map is encrypted using a user key.

3. The KV-SSD according to claim 2, wherein a host computer system provides the user key to the KV-SSD.

4. The KV-SSD according to claim 1, wherein the secure key share table is encrypted using a device encryption key.

5. The KV-SSD according to claim 1, wherein the secure key share table further maps the hash value to a share list of users that are permitted to access the object,
   wherein the KV-SSD blocks a second user from access to the object based at least in part on the share list of users omitting the second user.

6. The KV-SSD according to claim 5, further comprising a secure dedup manager to perform deduplication of the object and a second object with the hash value using the secure key share table, to manage user access to the object, and to protect the object from unwanted access.

7. The KV-SSD according to claim 6, wherein the dedup map further maps the hash value to a reference count of references to the data value.

8. The KV-SSD of claim 1, wherein the KV-SSD blocks access to the user to a second object based at least in part on the user secure object map not mapping a second object key for the second object to a second hash value.

9. A method, comprising:
   receiving a write request to write an object at a Key-Value Solid State Drive (KV-SSD) from a device, the object including a data value associated with an object key;
   calculating a hash value of the data value;
   updating a user secure object map to map the object key to the hash value, the user secure object map associated with a user; and
   updating a dedup map to map the hash value to an address where the data value is stored on the KV-SSD,
   wherein the KV-SSD grants access to the user to the object based at least in part on the user secure object map mapping the object key to the hash value.

10. The method according to claim 9, further comprising sending a response from the KV-SSD to the device, the response indicating that the data value was successfully written to the KV-SSD.

11. The method according to claim 9, wherein updating a user secure object map to map the object key to the hash value includes adding a new entry in the user secure object map mapping the hash value to the object key.

12. The method according to claim 9, wherein updating a user secure object map to map the object key to the hash value includes replacing an old hash value in an existing entry in the user secure object map including the object key with the hash value.

13. The method according to claim 9, wherein:

the method further comprises:

encrypting the data value using an object encryption key to produce an encrypted data value; and writing the encrypted data value at an address on the KV-SSD; and updating a dedup map to store the hash value includes adding a new entry in the dedup map mapping the hash value to the address.

14. The method according to claim 13, further comprising updating a secure key share table to map the hash value to an object encryption key, the object encryption key associated with a second user.

15. The method according to claim 14, wherein updating a secure key share table to map the hash value to an object encryption key includes adding a new entry in the secure key share table mapping the hash value to the object encryption key.

16. The method of claim 9, wherein the KV-SSD blocks access to the user to a second object based at least in part on the user secure object map not mapping a second object key for the second object to a second hash value.

17. A method, comprising:

receiving a read request to read an object at a Key-Value Solid State Drive (KV-SSD) from a device, the object identified by an object key;

mapping the object key to a hash value in a user secure object map, the user secure object map associated with a user;

mapping the hash value to an address in a dedup map; and reading a data value for the object from the address on the KV-SSD, wherein the KV-SSD grants access to the user to the object based at least in part on the user secure object map mapping the object key to the hash value.

18. The method according to claim 17, further comprising sending a response from the KV-SSD to the device, the response including the data value that was read from the address on the KV-SSD.

19. The method according to claim 17, further comprising returning an error based at least in part on the object key not mapping to a hash value in the user secure object map.

20. The method according to claim 17, wherein reading a data value for the object from the address on the KV-SSD includes:

reading an encrypted data value for the object from the address on the KV-SSD; and decrypting the encrypted data value using an object encryption key, the object encryption key associated with a second user.

21. The method according to claim 20, wherein decrypting the encrypted data value using an object encryption key includes mapping the hash value to the object encryption key in a secure key share table.

22. The method according to claim 21, wherein mapping the hash value to the object encryption key in a secure key share table includes:

mapping the hash value to a share list in the secure key share table; and verifying that the share list includes a user ID associated with the read request, wherein the KV-SSD blocks a second user from access to the object based at least in part on the share list of users omitting the second user.

23. The method of claim 17, wherein the KV-SSD blocks access to the user to a second object based at least in part on the user secure object map not mapping a second object key for the second object to a second hash value.

\* \* \* \* \*